(12) United States Patent
Dori

(10) Patent No.: US 7,099,809 B2
(45) Date of Patent: Aug. 29, 2006

(54) MODELING SYSTEM

(76) Inventor: Dov Dori, 5 Rotem Street P.O. Box 18, Kfar-Vradim (IL)

( * ) Notice: Subject to any disclaimer, the term of this patent is extended or adjusted under 35 U.S.C. 154(b) by 766 days.

(21) Appl. No.: 09/808,781

(22) Filed: Mar. 15, 2001

(65) Prior Publication Data
US 2002/0038206 A1   Mar. 28, 2002

Related U.S. Application Data

(60) Provisional application No. 60/216,532, filed on Jul. 5, 2000, provisional application No. 60/201,860, filed on May 4, 2000.

(51) Int. Cl.
*G06F 9/455* (2006.01)
*G06F 17/28* (2006.01)

(52) U.S. Cl. .................. 703/6; 703/13; 717/104; 704/2

(58) Field of Classification Search ........... 717/105, 717/106, 109, 113, 104, 132; 345/762, 763; 434/157, 169, 176; 704/2, 3, 4; 703/22, 703/6, 13
See application file for complete search history.

(56) References Cited

U.S. PATENT DOCUMENTS

| | | | | |
|---|---|---|---|---|
| 4,315,315 A | * | 2/1982 | Kossiakoff | 717/109 |
| 5,187,788 A | * | 2/1993 | Marmelstein | 717/109 |
| 5,321,607 A | * | 6/1994 | Fukumochi et al. | 704/4 |
| 5,386,556 A | * | 1/1995 | Hedin et al. | 707/4 |
| 5,481,668 A | * | 1/1996 | Marcus | 715/853 |
| 5,815,717 A | * | 9/1998 | Stack | 717/105 |
| 5,893,105 A | * | 4/1999 | MacLennan | 707/102 |
| 6,182,024 B1 | * | 1/2001 | Gangopadhyay et al. | 703/22 |
| 6,182,029 B1 | * | 1/2001 | Friedman | 704/9 |
| 6,195,631 B1 | * | 2/2001 | Alshawi et al. | 704/4 |
| 6,233,537 B1 | * | 5/2001 | Gryphon et al. | 703/1 |
| 6,311,144 B1 | * | 10/2001 | Abu El Ata | 703/2 |
| 6,343,265 B1 | * | 1/2002 | Glebov et al. | 703/25 |
| 6,421,821 B1 | * | 7/2002 | Lavallee | 717/109 |
| 6,564,368 B1 | * | 5/2003 | Beckett et al. | 717/113 |
| 6,681,383 B1 | * | 1/2004 | Pastor et al. | 717/126 |
| 6,897,866 B1 | * | 5/2005 | Hetzler et al. | 345/440 |
| 2004/0054511 A1 | * | 3/2004 | Turner et al. | 703/6 |

FOREIGN PATENT DOCUMENTS

| EP | 0387226 A1 | 5/1990 |
|---|---|---|
| EP | 0927939 A1 | 7/1999 |

OTHER PUBLICATIONS

Robert W. Sebesta, Concepts of Programming Languages, 1999, Addison Wesley Longman, Inc., Fourth Edition, pp. 105-125.*
Ada 95 Reference Manual, 1997, Kempe Software Capital Enterprises, §1.1.4 and Annex P.*
Hermann Kaindl, How to Identify Binary Relations for Domain Models, Proceedings of ICSE-18, 1996, pp. 28-36.*

(Continued)

*Primary Examiner*—Paul L. Rodriguez
*Assistant Examiner*—Jason Proctor
(74) *Attorney, Agent, or Firm*—Pearl Cohen Zedek Latzer, LLP

(57) ABSTRACT

Disclosed herein are techniques for generating textual descriptions of a graphic model and vice-versa. The techniques may be used, for example, in conjunction with a scheme that models objects and processes as independent entities. The techniques have a wide variety of applications including automatic code generation, system simulation, and language translation.

40 Claims, 38 Drawing Sheets

OTHER PUBLICATIONS

Jon Atle Gulla, A General Explanation Component for Conceptual Modeling in CASE Environments, ACM Transactions on Information Systems, 1996, vol. 14, No. 3, pp. 297-329.*

William J. Black, Acquisition of conceptual data models from natural language desriptions, Proceedings of the third conference on European chapter of the Association for Computational Linguistics, 1987, pp. 241-248.*

Dirk Jäger, Ansgar Schleicher, Bernhard Westfechtel; Using UML for software process modeling; ACM, 1999.*

Mor Peleg and Dov Dori; "Extending the Object-Process Methodology to Handle Real Time Systems"; Jan. 1999; Journal of Object-Oriented Programming, vol. 11 No. 8; pp. 1-19 renumbered.*

Dr. Dov Dori, "OPCAT: Object-Process CASE Tool", Aug. 1997, retrieved on Sep. 20, 2005 from http://web.archive.org.*

Dov Dori and Arnon Sturm; "OPCAT—Object-Process Case Tool: an Integrated SYstem Engineering Environment (ISEE)"; 1998; Springer-Verlag; pp. 1-2.*

Peter P. Chen, "From Ancient Egyptian Language to Future Conceptual Modeling", 1999, Springer-Verlag, LNCS 1565, pp. 1-9.*

Frank Shou-Cheng Tseng, Arbee L. P. Chen, and Wei-Pang Yang; "Extending the E-R Concepts to Capture Natural Language Semantics for Database Access"; 1991; IEEE; pp. 30-35.*

Mor Peleg and Dov Dori; "Representing Control Flow Constructs in Object-Process Diagrams"; 1998; Journal of Object-Oriented Programming, 1-21 renumbered.*

Peleg, M., et al: "From Object-Process Diagrams to a Natural Object-Process Language", 1999, Berlin, Germany, Springer-Verlag, Germany, Jul. 1999, pp. 221-228.

Tucker, A B Jr: "A Perspective on Machine Translation: Theory and Practice" Commun. ACM (USA), Communications of the ACM, Apr. 1984, USA, vol. 27, No. 4, Apr. 1984, pp. 322-329.

W3C: "Resource Description Framework (RDF) Model and Syntax Specification" Feb. 22, 1999, Retrieved from the Internet: URL:http://www.w3.org/TR/1999/REC-rdf-synt ax 19990222/>retrieved on Feb. 13, 2004.

"The Model Multiplicity Problem: Experimenting with Real-Time Specification Methods" by Mor Peleg and Dov Dori; IEEE Transactions on Software Engineering, vol. 26, No. 8 Aug. 2000.

"Object-process Based Graphics Recognition Class Library: Principles and Applications" by Liu Wenyin and Dov Dori; Software-Practice and Experience, 29(15), pp. 1255-1378 Copyright 1999.

"Object-process Analysis of Computer Integrated Manufacturing Documentation and Inspection Functions" by Dov Dori; Int.J. Computer Integrated Manufacturing, vol. 9, No. 5, pp. 339-353 Copyright 1996.

"Object-process Analysis: Maintaining the Balance Between System Structure and Behaviour" by Dov Dori; J. Logic Computat., vol. 5 No. 2, pp. 227-249 Copyright 1995.

"On Bridging the Analysis-design and Structure-behavior Grand Canyons with Object Paradigms" by Dov Dori and Moshe Goodman; JOOP, vol. 2 No. 5, pp. 25-35.

"A Generic Integrated Line Detection Algorithm and Its Object-Process Specification" by Liu Wenyin and Dov Dori; Computer Vision and Image Understanding, vol. 70 No. 3, pp. 420-437, Copyright 1998.

"Object-process Diagrams as an Explicit Algorithm-specification Tool" by Liu Wenyin and Dov Dori; JOOP, May 1999.

"Representing Pattern Recognition-embedded System Through Object-process Diagrams: The case of the Machine Drawings Understanding System" by Dov Dori; Pattern Recognition Letters, vol. 16 pp. 377-384, Copyright 1995.

"Analysis and Representation of the Image Understanding Environment Using the Object-process Methodology" by Dov Dori; JOOP, Jul./Aug. 1996 pp. 30-38.

* cited by examiner

OPM System Model can be visual or textual.
Sight Map is a visual OPM System Model.
Formal Script is a textual OPM System Model.
Sight Map and Formal Script are informatically equivalent.
Sight Map consists of one or more Sight Diagrams.
Formal Script consists of one or more Formal Paragraphs.
OPM Subsystem Model can be visual or textual.
Sight Diagram is a visual OPM Subsystem Model.
Formal Paragraph is a textual OPM Subsystem Model.
Sight Diagram and Formal Paragraph are informatically
    equivalent.
Sight Diagram consists of one or more Sight Sentences.
Formal Paragraph consists of one or more Formal Sentences.
OPM Sentence can be visual or textual.
Sight Sentence is a visual OPM Sentence.
Formal Sentence is a textual OPM Sentence.
Sight Sentence and Formal Sentence are informatically
    equivalent.
Formal Sentence consists of one or more Formal Phrases.
Sight Sentence consists of one or more Sight Phrases.
OPM Phrase can be visual or textual.
Sight Phrase is a visual OPM Phrase.
Formal Phrase is a textual OPM Phrase.
Sight Phrase and Formal Phrase are informatically equivalent.
Formal Phrase consists of one or more Words.
Word consists of one or more Letters.
Initial Letter is a Letter.
Initial Letter can be capitalized or non-capitalized.
Thing and Value exhibit capitalized Letter.
State and Tag exhibit non-capitalized Letter.
Formal Phrase can be non-reserved or reserved.
Sight Phrase exhibits Shape.
Shape can be open or closed.
Entity and Connector are OPM Phrases.
Closed Shape visually identifies Entity.
Non-reserved Formal Phrase textually identifies Entity.
Open Shape visually identifies Connector.

FIG. 22

Reserved Formal Phrase textually identifies Connector.
Closed Shape contains non-reserved Formal Phrase.
Thing and Value are Entities.
Scaling affects Thing.
Structural Link and Procedural Link are Connectors.
Transformation Link and Enabling Link are Procedural Links.
Connector exhibits Source and Destination.
Agent Link and Instrument Link are Enabling Links.
Effect Link, Input Link, Output Link, Consumption Link, Result Link, and
    Invocation Link are Transformation Links.
Effect Link consists of Input Link and Output Link.
Fundamental Structural Link and Tagged Structural Link are Structural Links.
Non-reserved Formal Phrase textually identifies Tagged Structural Link.
Aggregation Link, Generalization Link, Exhibition Link, and Classification Link
    are Fundamental Structural Links.
Thing instantiates optional Instances.
Thing exhibits optional Features.
Feature is a Thing.
Thing exhibits Perseverance.
Perseverance is a Feature.
Perseverance can be static or dynamic.
Object is a Thing, the Perseverance of which is static.
Process is a Thing, the Perseverance of which is dynamic.
Ellipse, Rectangle, and Rountangle are closed Shapes.
Rectangle visually identifies Object.
Ellipse visually identifies Process.
Attribute and Operation are Features.
Attribute is an Object.
Operation is a Process.
Attribute instantiates Value.
Rountangle visually identifies Value.
Status is an Attribute.
State instantiates Status.
State is a Value.
Changing affects Object.
Changing requires Process.
Changing consumes Pre Value.
Changing yields Post Value.

FIG. 23

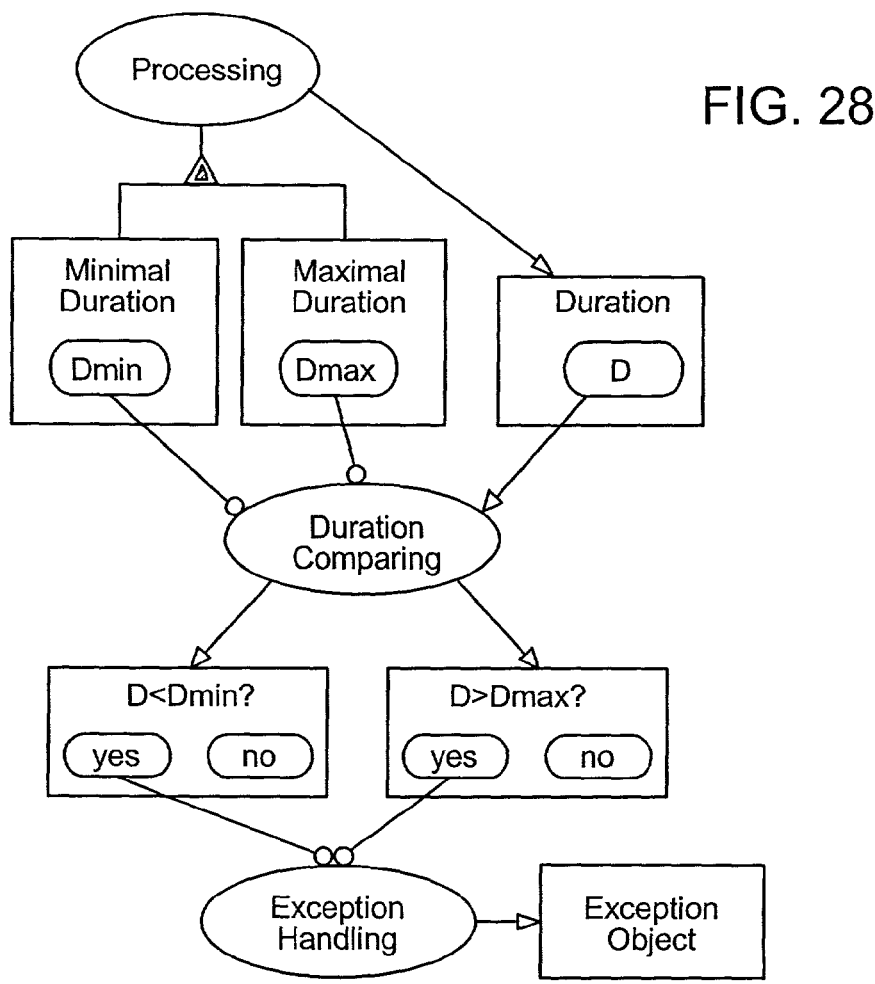

FIG. 28

Processing exhibits Minimal Duration with value Dmin, and Minimal Duration, with value Dmax.

Processing yields Duration with value D.

Duration Comparing requires Dmin and Dmax.

Duration Comparing consumes D.

Duration Comparing determines whether D is less than Dmin.

Duration Comparing determines whether D is more than Dmax.

Exception Handling occurs if either D is more than Dmax or D is less than Dmin.

Exception Handling yields Exception Object.

Object Building consists of 2 Elevators.
Object Elevator features ID, OutstandingRequests and LocationStatus.
  Object[simple] ID:short [key].
  Object OutstandingRequests has states no and yes.
  Object LocationStatus has states atFloor and betweenFloors.
Elevator consists of Door.
  Object Door has states open and closed.
  Door features process Closing.

Event Door_open [state-entrance] of Door of Elevator [ID in {1 to 2}] of Building triggers Closing of Door of Elevator[ID] of Building with a reaction time of (4,4).

Process Closing is guarded by "Door is open",
  "OutstandingRequests of Elevator is yes" and
  "LocationStatus of Elevator is atFloor".
Closing affects Door of Elevator from open to closed and
  LocationStatus of Elevator from atFloor to betweenFloors.

FIG. 31B

```
1  class Building : public Object {
2  private:
3    class Elevator : public Object {
4    private:
5      Building *f;
6      short ID;
7    public:
8      short get_ID(void);
9      void set_ID(short t);
10   private:
11     class Door : public Object {
12     private:
13       Elevator *f;
14       State* closed;    // same for State open: ...
15     public:
16       void set_closed(BOOLEAN enter, short Invoker);
17       void enter_closed(short Invoker);
18       void enter_closed(void);
19       enum door get_Door(void);
20       friend Elevator;
21     private:
22       class Closing : public Process {
23       private:
24         Door *f;
25         void Execute(short Invoker, short Triggering_Event);
26       public:
27         Closing(void);
28         BOOLEAN Trigger(short Invoker, short
29                 Triggering_event);
30         friend Door;
31       };
32     public:
33       Closing the_Closing;
34       friend Closing;
35       Door(void);
36     };
37   public:
38     Door the_Door;
// LocationStatus and OutstandingRequests are defined in
// a way similar to Door
...
39     Elevator(void);
40   };
41 public:
42   Elevator the_Elevator[2];
43   Building(void);
44 };
45 extern Building the_Building;
```

Elevator features simple object ID

Elevator consists of Door

Door features Process Closing

FIG. 32

```
BOOLEAN Building::Elevator::Door::Closing::Trigger(short Invoker, short
Triggering_event)
{
  BOOLEAN result = TRUE;

if (f->get_Door()==OPEN)
      result = TRUE;  // if the Elevator Door is OPEN then
                      // proceed to check if there are
                      // OutstandingRequests for the Elevator
  else
      result = FALSE;
  if (result == TRUE)
  {
      if
       (f->f->the_OutstandingRequests.get_OutstandingRequests()==YES)
          result = TRUE;  // if there are OutstandingRequests then
                          // proceed to check if Elevator is ATFLOOR
      else
          result = FALSE;
  }
  if (result == TRUE)
  {
      if (f->f->the_LocationStatus.get_LocationStatus()==ATFLOOR)
          result = TRUE; // if if Elevator is ATFLOOR then
                         // proceed to open the Elevator Door
      else
          result = FALSE;
  }
  if (result == TRUE)
  {
      Execute(Invoker, Triggering_event); // open the Door
      return TRUE;
  }
  else
      return FALSE;
}
```

FIG. 33

```
void _EventProcessTable::TriggerAllProcesses(Event *e)
{
    Process *process_ptr;

switch(e->get_id())         // get id of triggering Event
    // (e.g., door_open)
    {
        case dooropen:  switch (e->get_trig_obj()){
                        // get id of triggering object
            case elevator1:
                process_ptr =
                    &the_Building.the_Elevator[0].the_Door.the_Closing;
                break;
            case elevator2:
                process_ptr =
                    &the_Building.the_Elevator[1].the_Door.the_Closing;
                break;
        }
        TryToTrigger(e,process_ptr, 0,4,0,0,0,4,0,0,
            e->get_trig_obj(), e->get_id());
        break;
    }
}
```

FIG. 34

```
void Building::Elevator::Door::Closing::Execute(short Invoker,
short Triggering_event)
{
    Process::Execute(Invoker, Triggering_Event);
    f->f->the_Door.enter_closed(Invoker);
    f->f->the_LocationStatus.enter_betweenFloors();
}
```

FIG. 35

MODELING SYSTEM

REFERENCE TO RELATED APPLICATIONS

This relates and claims priority to co-pending U.S. Provisional Patent Application Ser. No. 60/201,860, filed May 4, 2000; and co-pending U.S. Provisional Patent Application Ser. No. 60/216,532, filed Jul. 5, 2000. Both applications are incorporated by reference herein in their entirety.

BACKGROUND

Many system designs begin as ad hoc sketches on the back of a napkin. These crude diagrams attest to the value of diagramming as a design tool. A relatively simple diagram can depict important interactions and relationships between different system components. Oftentimes, however, a drawing may later appear confusing or ambiguous to its own author. This problem often stems from a lack of notational consistency in a diagram.

A wide variety of modeling methodologies attempt to formalize the meaning associated with different diagram symbols. For example, UML (Unified Modeling Language) provides a general-purpose notational language for specifying and visualizing complex software and other systems. In particular, UML proponents advocate an approach that represents a system as a collection of objects. Different types of UML diagrams can portray various views of the system.

Many different vendors offer design tools that ease construction of system diagrams. For example, Rational Rose® provides a suite of tools that ease construction of UML diagrams. These tools provide a user interface that features a palette of UML graphic symbols for placement on a diagram.

SUMMARY

In general, in one aspect, the invention features a computer-implemented method of modeling. The method includes receiving input specifying at least one graphic element of a model diagram. The diagram can include graphic elements representing a process and graphic elements representing an object. Based on the received input, the method generates a textual description of the diagrammed model.

Embodiments may include one or more of the following features. The graphic elements may correspond to a graphical notation, such as OPM (Object-Process Methodology), that models objects and processes as independent elements.

Generating the textual description may include determining one or more context-free grammar production rules corresponding to the input, and generating a context-free grammar expression from the one or more context-free grammar production rules. The production rules may be consistent with a natural language such as English.

The received input may be user input. For example, the textual description may be generated as a real-time response to user input manipulating, adding, or deleting graphic elements. Generating the textual description may also proceed in a batch mode.

The received input may specify a level of detail to depict. Additionally, the method may include determining a portion of the textual description to display based on the received input specifying the level of detail.

The method may include translating a label of a graphic element from a first natural language to a second natural language. Such a method may use production rules of a context-free grammar for the second natural language.

The method may also include using the generated text to automatically generate software instructions to implement the model or to provide a visual simulation of a modeled system.

In general, in another aspect, the invention features a computer-implemented method of modeling. The method includes receiving a textual description of a model and, based on the received description, generating a model diagram composed of different graphic elements. The different graphic elements can include a graphic element representing a process and a graphic element representing an object.

In general, in another aspect, the invention features a method of translating text from a first natural language to a second natural language. The method includes receiving input specifying a diagram including elements labeled in accordance with a first natural language, translating the element labels from the first natural language to the second natural language, and generating text in the second natural language in accordance with a grammar associated with the diagram elements.

In general, in another aspect, the invention features a computer program product, disposed on a computer readable medium, for modeling. The computer program includes instructions for causing a processor to receive input specifying at least one graphic element of a model diagram. Different graphic elements in the diagram can include a first graphic element representing a process and a second graphic element representing an object. Based on the received input, the instructions can generate a textual description of the diagrammed model.

In general, in another aspect, the invention features a computer program product, disposed on a computer readable medium, for modeling. The computer program includes instructions for causing a processor to receive a textual description of a model, and, based on the received description, generate a model diagram composed of different graphic elements that can include a first graphic element representing a process and a second graphic element representing an object.

Advantages will become apparent in view of the following description, including the figures and the claims.

BRIEF DESCRIPTION OF THE DRAWINGS

FIGS. 22 and 23 are listings of formal text corresponding to the OPM diagram of FIG. 21.

FIGS. 25–30 are diagrams illustrating temporal features of OPM.

FIGS. 32–35 are listings of code automatically generated for the diagram depicted in FIG. 30.

DETAILED DESCRIPTION

Figure 1:
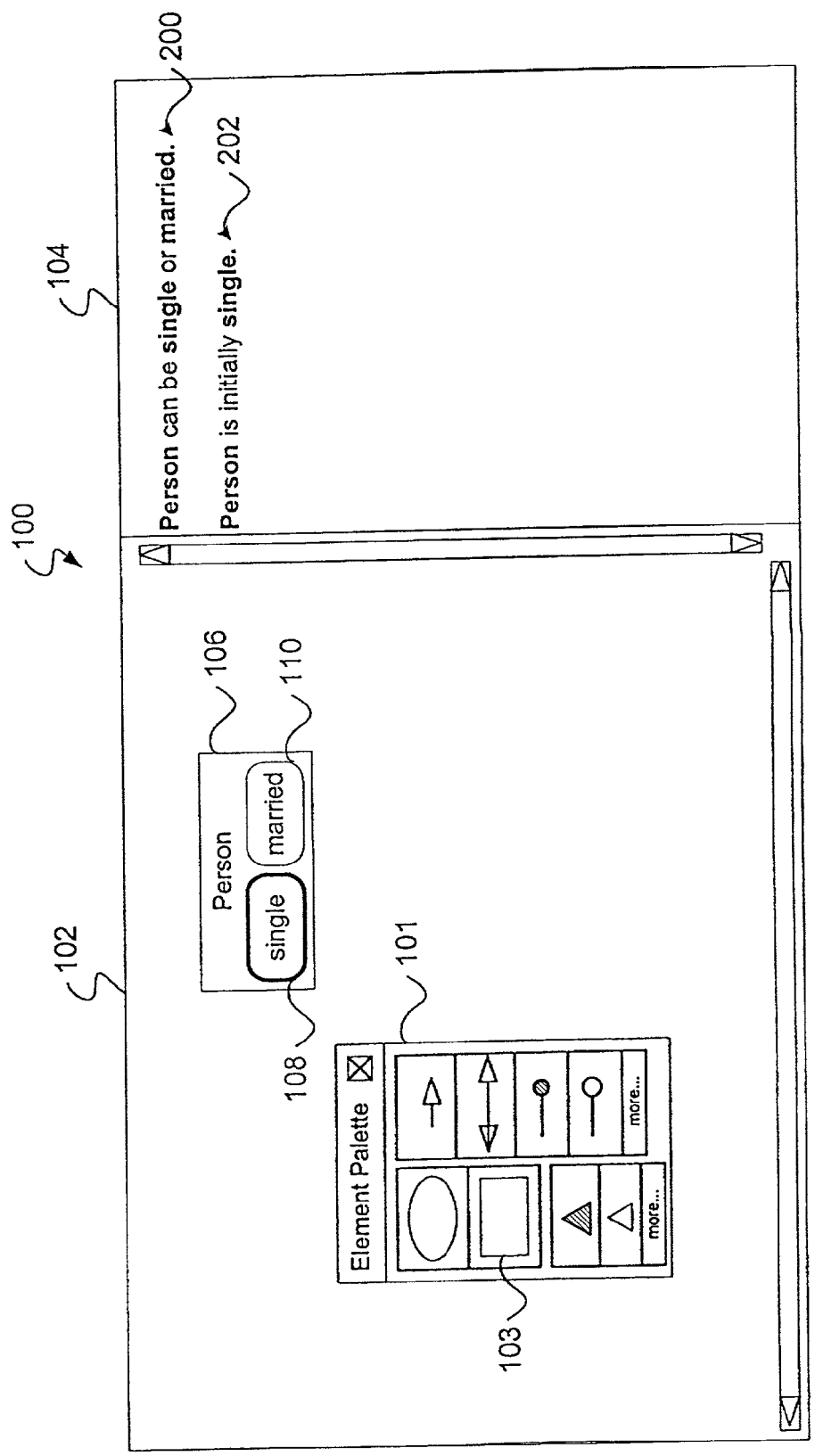
FIGS. 1 to 20 are screenshots of a modeling tool that expresses a system model both graphically and textually.

FIGS. 1 to 20 illustrate a user interface provided by a modeling tool. Each user interface screen 100 shown features a graphic design workspace 102 ("DiagraMaker"). The workspace 102 enables a user to assemble and interconnect graphic elements to model a system. As shown, the tool's user interface may provide a palette 101 of graphic symbols representing model elements. For example, the tool enables a user to drag-and-drop model elements from the palette 101 onto the workspace 102 for configuration into a system model. The model elements shown in the palette 101 of FIG. 1 correspond to a graphic notation defined by OPM (Object-Process Methodology).

Object-Process Methodology enables a user to define processes and objects as independent entities. Independent representation of objects and processes reflects the thought process of many designers, and, thus, facilitates rapid model development. Additionally, even those initially unfamiliar with OPM can quickly grasp components and behavior represented by an OPM model. FIGS. 1–20 illustrate model elements offered by OPM. Appendix A includes a list of all such elements, their usage, and meanings.

As shown, FIGS. 1–20 also feature a script window 104 ("TextMaker") that present the textual, formal English, equivalent of a diagram in the workspace 102. These sentences are referred to as OPL (Object Process Language) herein. A user can enter text into the script window 104 by typing, using speech recognition, opening a file, and so forth.

The tool can maintain the equivalence of the script window 104 description and the workspace 102 diagram, whether a user alters the diagram in the workspace 102 or changes the text in the script window 104. That is, the tool can alter or add graphic model elements to conform to the text description in the script window 104 and can automatically generate sentences reflecting changes or additions to a diagram. Hence, the informational content of the text description and graphic diagram remains equivalent. Additionally, one may be completely reconstructed from the other.

The precise description of a modeled system provided by the text permits review of the design by domain experts or managers who may have little technological experience or prior experience with graphic models. Additionally, even though easily digested by lay people, the text provides an unambiguous specification for system implementation, for example, by programmers.

In general, to maintain equivalence between diagram and text, the tool associates model elements and model element combinations with formal English sentence types. As user input graphically specifies model elements and their relationships, the modeling tool can automatically generate the corresponding text sentences. Such real-time feedback can quickly alert users to unintended design errors as they occur.

The text shown conforms to a context-free grammar defined to generate natural language (e.g., English) sentences. Appendix B includes a listing of the context free grammar production rules. Production rules can be expressed in a wide variety of formats, such as BNF (Backus-Naur Format), EBNF (Extended Backus-Naur format) and so forth. While the rules shown feature English words and syntax, other production rules may reflect other natural languages.

The equivalence of the text and graphic model representations is, again, a two-way street. That is, instead of generating the text from a diagram, the tool can automatically generate a system diagram from text. That is, the modeling system can use the production rules, such as the rules shown in Appendix B, to parse a given statement and construct a corresponding diagram. For example, as a user translates prose systems requirements specification into the modeling system's context-free grammar expressions, the tool can depict the equivalent diagram elements in the diagram window 102. Again, the tool's use of ordinary English text to describe a system increases operator familiarity, eases use, and can speed system design. To provide a better understanding of the correspondence between graphics and text, the tool can highlight graphic constructs corresponding to a sentence when the user rests a cursor on the sentence, and vice-versa.

Though shown as a system that responds to user input in real-time, the system may operate in batch-mode. For example, a user may submit, or open, a script of formal English sentences arranged in paragraphs and be presented with the corresponding set of diagram(s), one for each paragraph. Formal English sentences, described below, can indicate the links between the different diagrams. Similarly, a user may completely draw a set of diagrams that specify a system before requesting automatic generation of the corresponding text. Either the real-time or batch-modes may be implemented as an interpreter and/or a compiler. Additionally, rather than presenting a generated script or set of diagrams, the system may instead save such information as a file.

To illustrate OPM features and the equivalence of the graphic and text expressions of a model, FIGS. 1–20 depict development of a wedding system that marries two people. While software designers can use OPM for software system development, the example that follows illustrates that OPM can represent systems in a wide variety of domains.

As shown, to model a wedding system a designer created an object 106 labeled "Person" in the workspace 102. For example, the designer may have selected a graphic symbol of an object 103, a rectangle, from the palette 101 and positioned the object 106 on the workspace 102.

An object 106 can have different states. A "rountangle" ("rounded-corners rectangle") graphically depicts an object's state inside the object's box. As shown, a designer has specified that a person 106 object includes a state 108 labeled "single" 108 and a state 110 labeled "married". Additionally, as indicated by the bolding of the "single" 108 state's border, the designer has specified that a "Person" 106 object initially assumes the "single" 108 state.

The scripting window 104 presents the formal English sentences 200, 202 corresponding to the diagram depicted in the workspace 102. Other configurations present the information shown in the workspace 102 and scripting window 104 in different ways. For example, the system may permit user configuration and arrangement of the windows 102, 104, menu bars, palettes 101, and so forth. Additionally, the tool need not display the workspace 102 and scripting window 104 simultaneously. The tool may also feature other windows, such as those containing hierarchical lists of previously defined objects and/or processes and their attributes, software instructions or database schemas automatically generated from the script and/or diagram, and so forth.

The tool constructs the sentences presented in the scripting window 104 by combining the graphic element labels with reserved phrases of one or more words associated with a graphic element. For example, a "state enumeration" sentence according to the production rules in Appendix B can be expressed as "Object can be State List" where the Object is replaced by the object 106 label "Person" and State List is replaced by a list of the object's states' labels (i.e., "single" and "married"). Thus, as shown, the scripting window includes a text sentence 200 of "Person can be single or married".

The tool can use text formatting to bold labeled elements while reserved phrases (e.g., "can be") appear in a normal, non-bolded font. This convention emphasizes the elements of the system rather than the reserved phrases that may appear again and again in a script. The convention also enables a user to quickly identify relationships between domain-specific names of objects, processes, and states. Additionally, the system may enable a user to color code diagram elements and format the text to color terms to match the color of their corresponding diagram elements.

Again, while described as generation of text based on manipulation of elements in the workspace 102, the tool can also accept text and modify the graphic depiction to reflect this text. For example, formatting a text term as a specific color can cause the system to correspondingly color associated diagram elements.

The tool can provide feedback to guard against illegal constructs. For example, if a user attempts to insert a formal English sentence that does not conform to the formal English syntax, the system can generate a list of the closest legal options for user selection. Likewise, if the user attempts to insert a graphical construct not recognized by the system as legal, the tool can generate a list of the closest legal graphical arrangements for user selection. In either case, the tool can direct the user to an appropriate part of a tool help/tutorial facility.

Figure 2:
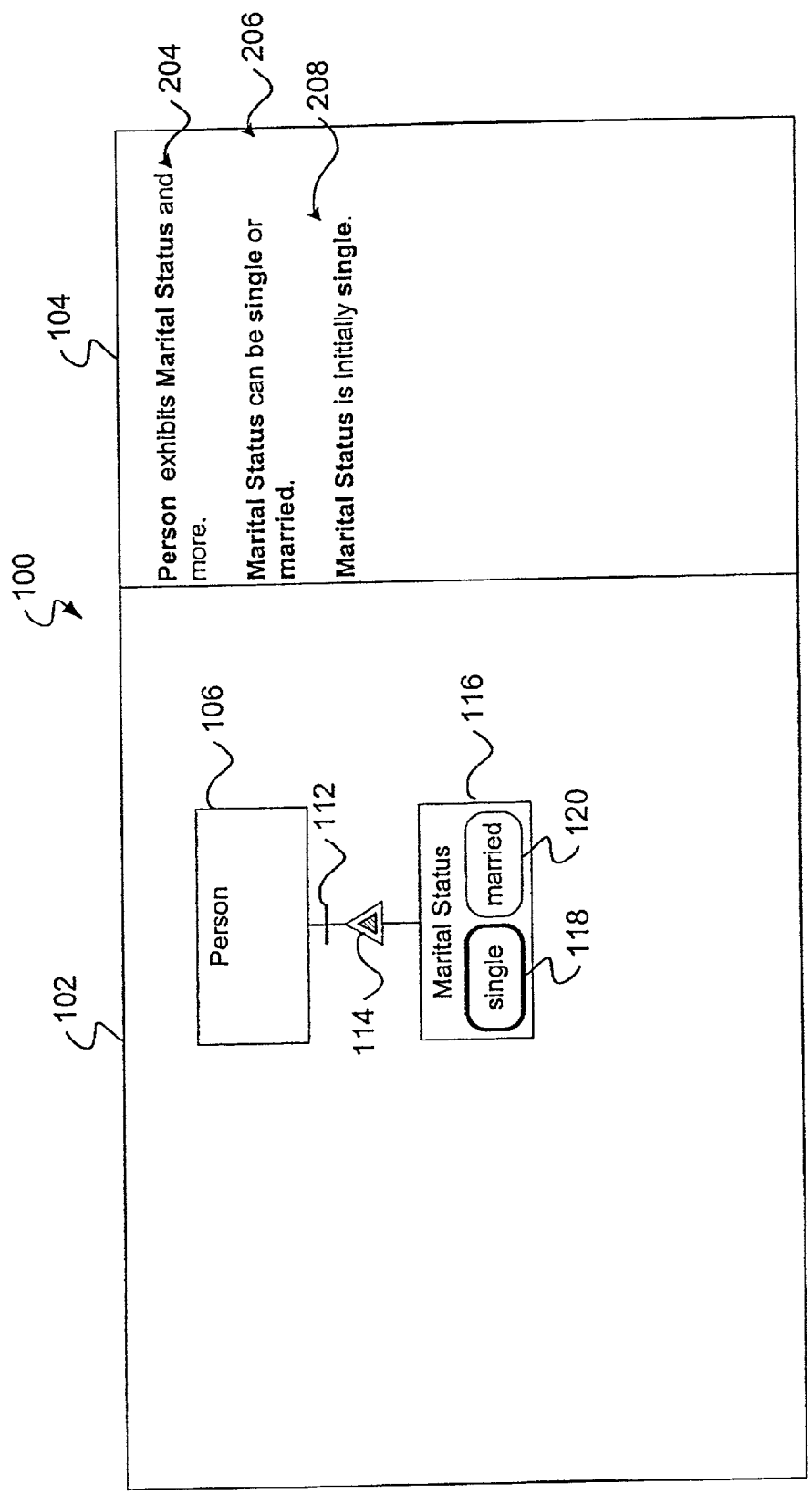

OPM permits alternate representations of similar system features. For example, as shown in FIG. 2, instead of directly attributing states to the "Person" object 106, a designer can use an "exhibition-characterization" graphic element 114 to elaborate on characteristics exhibited by another element. The tool depicts the "exhibition-characterization" graphic element 114 as a dark triangle within a white triangle. As shown, the designer has added a new object 116, labeled "Marital Status", that features the states of "single" 118 and "married" 120. By connecting the "Marital Status" object 116 to the "Person" object 112 via the "exhibition-characterization" graphic element 114, the diagram expresses that a marital status characterizes each person.

As shown, the designer also used a "non-comprehensive" symbol 112 that indicates that a person features other characteristics which are not depicted in the diagram. The "non-comprehensive" symbol 112 appears as a line segment crossing a connection between the person object 106 and the graphic element 112 (i.e., the "exhibition-characterization" symbol) defining the relationship between the objects 106, 116. As shown in sentence 204, the text associated with this symbol features the words "and more". The "non-comprehensive" symbol can also be used to characterize other symbols such as "aggregation" and "specialization" symbols described below.

While a bit more involved than FIG. 1, the diagram of FIG. 2 permits greater system design flexibility. For example, a designer can easily add more features (attributes and/or operations) for a person. Additionally, comparing the text 204–208 of FIG. 2 with the text 200–202 of FIG. 1 illustrates how different sentences can express essentially the same system. This flexibility enables designers to express a system in their own style without losing the rigorous formalism provided by OPM.

Figure 3:
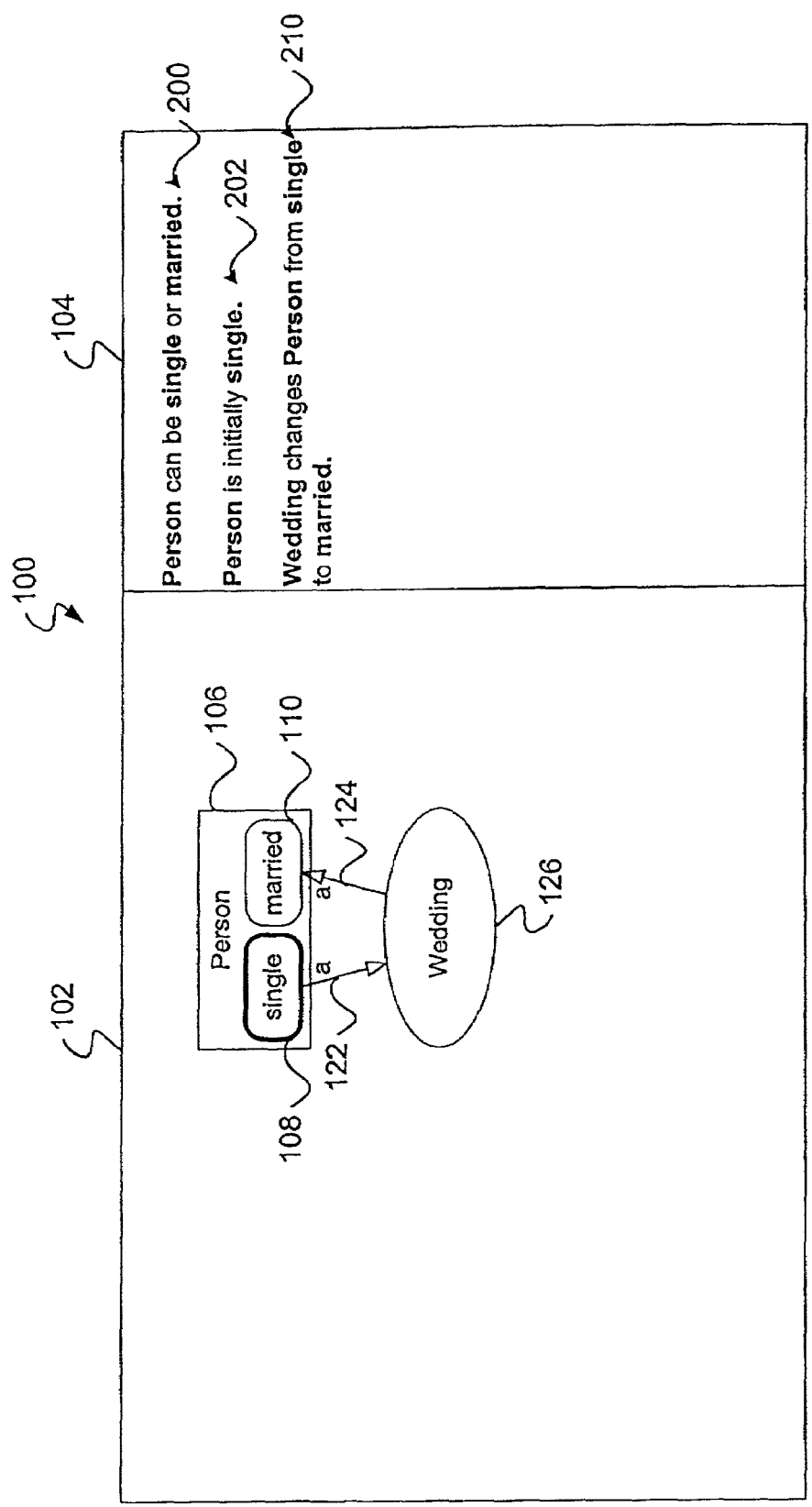

FIG. 3 introduces an important aspect of OPM. As shown, a user has inserted a process symbol 126, depicted as an ellipse, into the diagram. A process is an entity that transforms an object. As shown, the user has labeled the process 126 "Wedding", conforming to OPM's suggested practice of using the gerund form of verbs to name processes.

As shown in FIG. 3, using OPM, a designer can represent both system processes 126 and objects 106 as independent "things". Again, an object can include one or more possible states. A process affects an object by changing its current state(s). Representing a system with independent objects and processes results in an intuitive diagram reflecting both system structure and dynamics. For example, even before a more formal discussion, many can intuit from the diagram shown in FIG. 3 that a "Wedding" changes a "Person" from "single" to "married". A reading of the corresponding text 210 explicitly expresses this interoperation of the "Wedding" process 126 and "Person" object 106.

In greater detail, after adding and labeling the "Wedding" process 126, a user specified the transformation of the "Person" object 106 provided by the "Wedding" process 126 by a pair of links 122, 124. Each link 122, 124 appears as a line terminating in hollow arrowhead. The links 122, 124 have different sources and destinations. That is, link 122 leads from the "single" state 108 to the "Wedding" process 126, while link 124 leads from the "Wedding" process 126 to the "married" state 124. In OPM terminology, link 122 forms an "input link" that represents the leaving of the "single" state 108. Similarly, link 124 forms an output link that represents entry into the "married" state 124. The pair of links 122, 124 identify the "Wedding" process as changing a "Person" 106 from the "single" 108 state to "married" 110 state. As shown, the pair of links 122, 124 can share a thread label (e.g., "a") that can distinguish this pair 122, 124 from others in a diagram. Thread labels permit identification of potentially parallel threads of execution.

Figure 4:
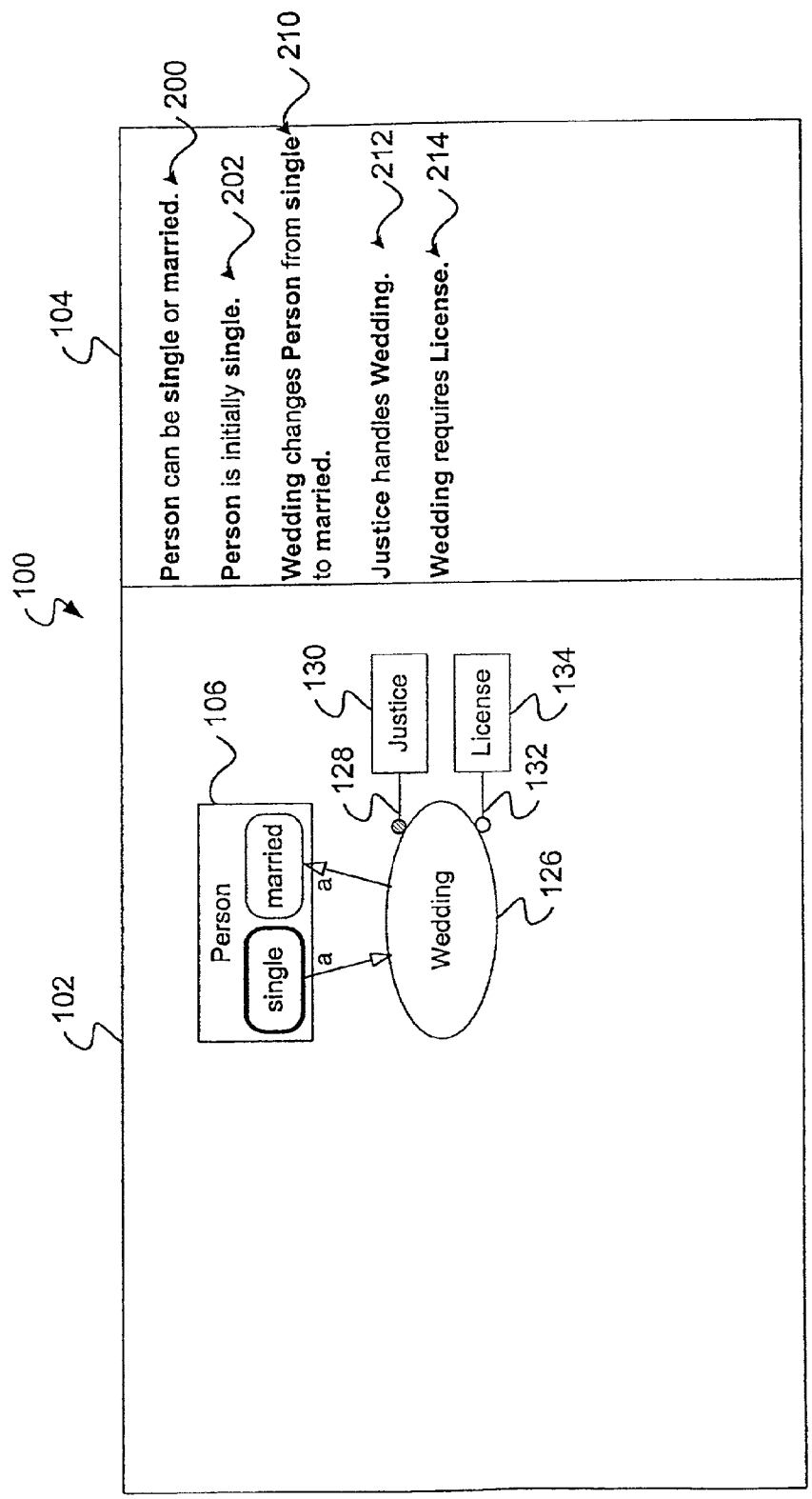

As shown in FIG. 4, an element may have associated "enablers" 130, 134. An enabler 130, 134 is an object that is required for a process to occur, but itself is not affected by the process occurrence. For example, a wedding requires both a justice of the peace and a marriage license. To reflect this, as shown in FIG. 4, a designer specified that the "Wedding" process 126 requires both a "Justice" enabler 130 and a "License" enabler 134. As shown, a line terminating in a "lollipop" identifies enabler relationships.

OPM and the tool can distinguish between different categories of enablers. For example, one type of enabler is known as an "agent." An agent, such as a human or organizational unit, exhibits discretion. Other types of enabler's are deemed "instruments". Blackened lollipops identify agents while hollow lollipops identify instruments. FIG. 4 depicts the "Justice" enabler 130 as an agent and the license as an instrument. This reflects the designer's acknowledgment that a "Justice" may exercise judgment before marrying two people, while a marriage license offers nothing other than its provisions. The involvement of an agent in a process can imply a need for some kind of user interface in the ultimate system implementation.

While terms like "enablers", "agents", and "instruments" may require a bit of explaining to those unfamiliar to OPM, the text sentences 212–214 eschew this terminology in favor of simpler descriptions. For example, the text generated for the agent relationship between the "Justice" object 130 and the "Wedding" process 126 simply states "Justice handles Wedding." 212. This concise phrasing clearly communicates the design depicted by the diagram to those unfamiliar with OPM notation or its terminology.

Figure 5:
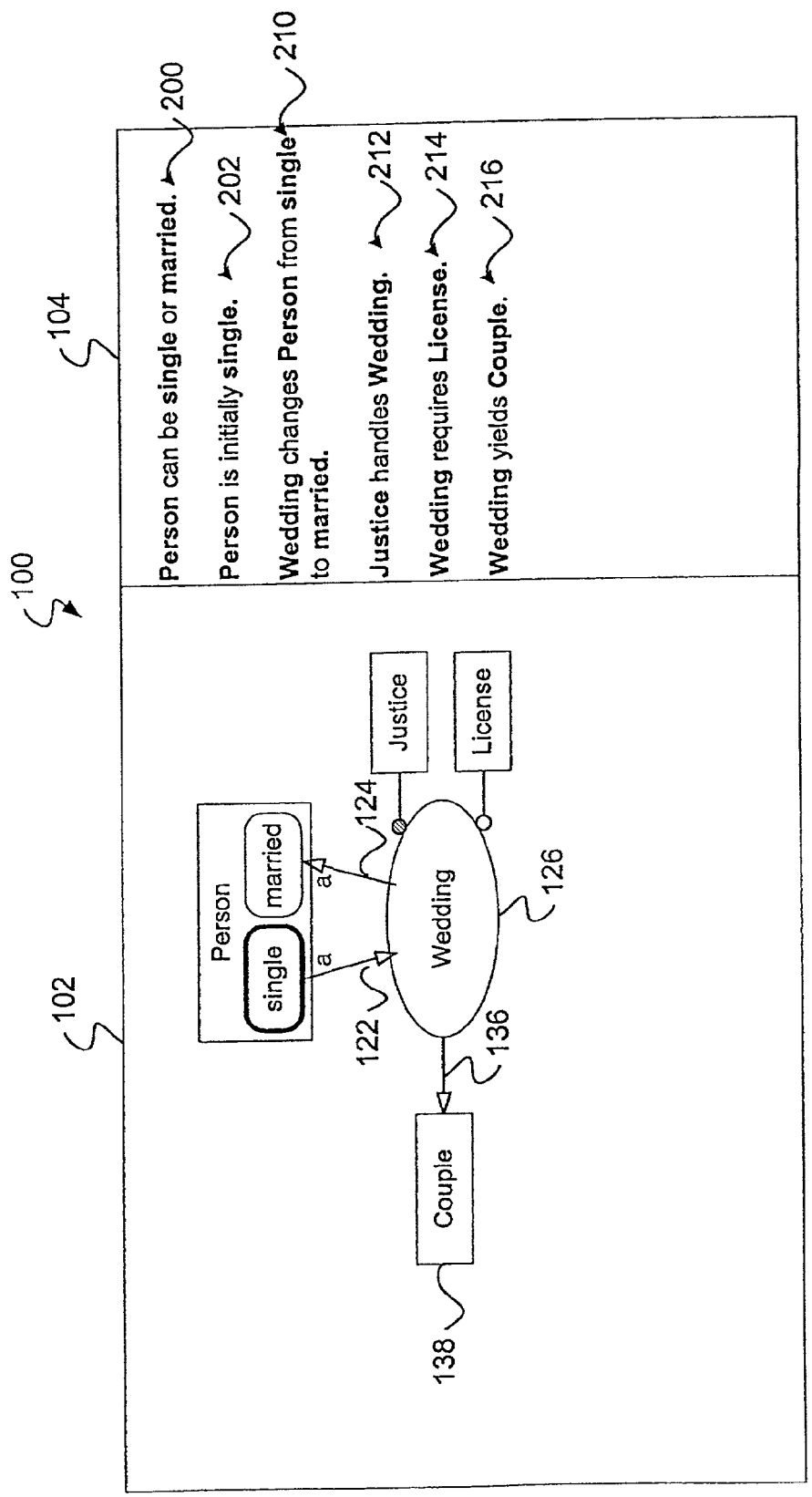
Figure 6:
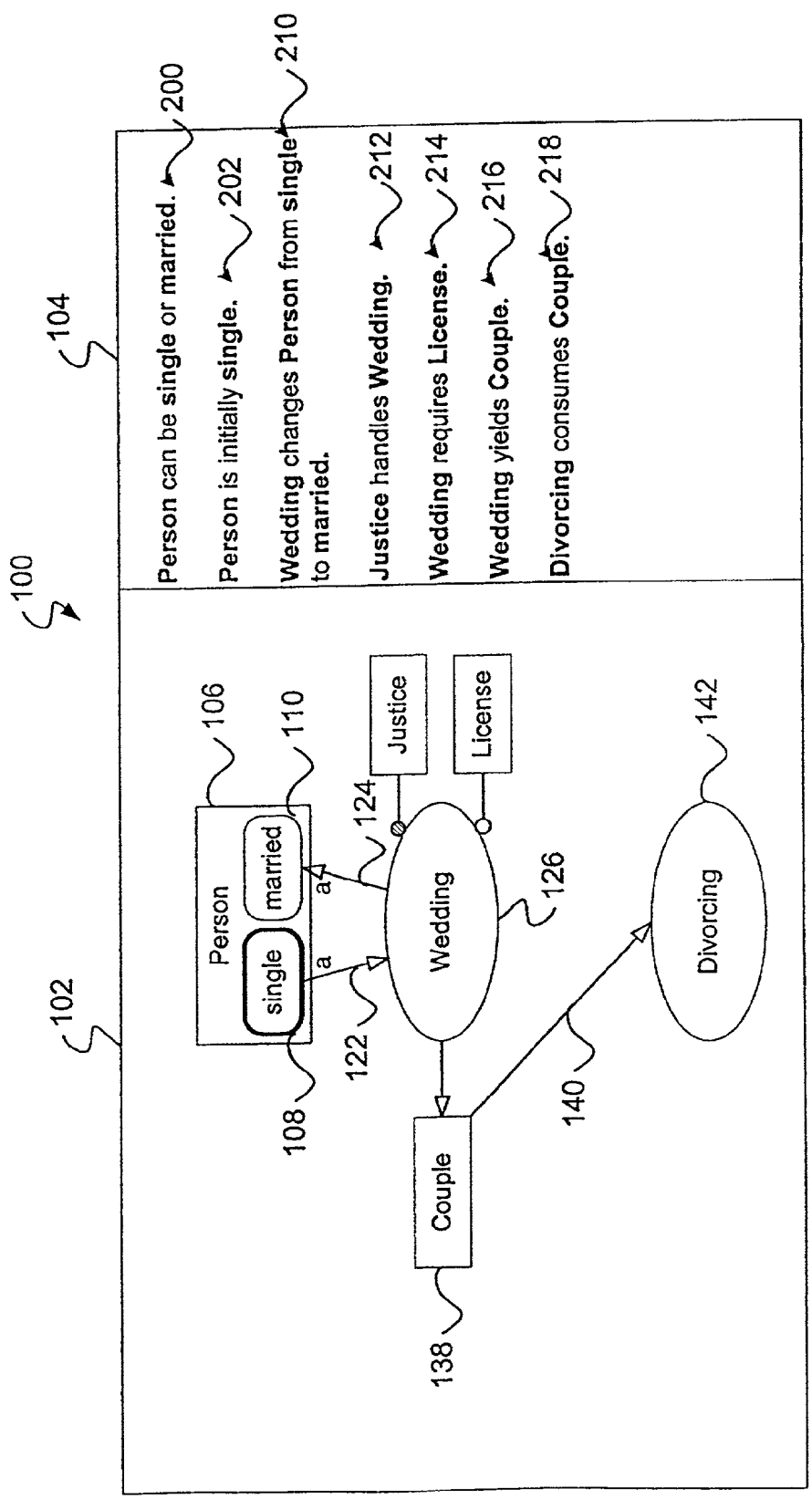

As previously described, processes transform objects by changing their states. For example, FIG. 3 illustrated a process 112 altering an object 106 by changing an object's 106 state. As shown in FIGS. 5 and 6, processes may also construct (generate) or destroy (consume) objects. For example, a wedding generates a new couple. FIG. 5 illustrates this transformation by the addition of a "Couple" object 138 and a link 136. While the link 136 appears identical to the "input" 122 link introduced in FIG. 3 (i.e., a line terminated by a hollow arrowhead), the context of the link 136 imparts a different meaning. That is, since the link 136 connects to the "Couple" object's 136 border instead of some internal state, the link 136 represents construction of the object 136. This construction is analogous to a "constructor" in C++. Again, instead of technical lingo, the text sentence 216 corresponding to this construction states "Wedding yields Couple". This natural phrasing expands the audience of the model to those less familiar with programmatic concepts.

Just as a wedding creates a couple, a divorce destroys it. Thus, FIG. 6 depicts a "Divorcing" process 142 that destroys the "Couple" object 138 constructed by the "Wedding" process 112. The link 140 that establishes this relationship between the "Couple" object 138 and the "Divorcing" process 142 appears identical to the output link 124 leading from the "Wedding" process 112 to the "married" state 110. However, again the context of the link 140 imparts a different meaning. That is, the link 140 extends to the "Divorcing" process 142 from the "Couple" object 138 perimeter instead of from some internal "Couple" object 138 state. This context indicates the destination process 142 consumes the source object 138. The text, "Divorcing consumes Couple" 218, states the relationship between the object 138 and process 142 with blunt clarity.

A model often changes over the lifecycle of a system. Such changes occur frequently during the initial design as users try different model configurations. Such changes also occur during maintenance phases, for example, after practice reveals deficiencies in an original model. The tool reflects changes in the diagram or equivalent text to maintain equivalence between the two. For example, user removal of the "Divorcing" process 142 from the diagram causes removal of consumption link 140 and the corresponding text sentence 218. Similarly elimination of sentence 218 causes removal of the "Divorcing" process 142 and consumption link 140 from the diagram.

Figure 7:
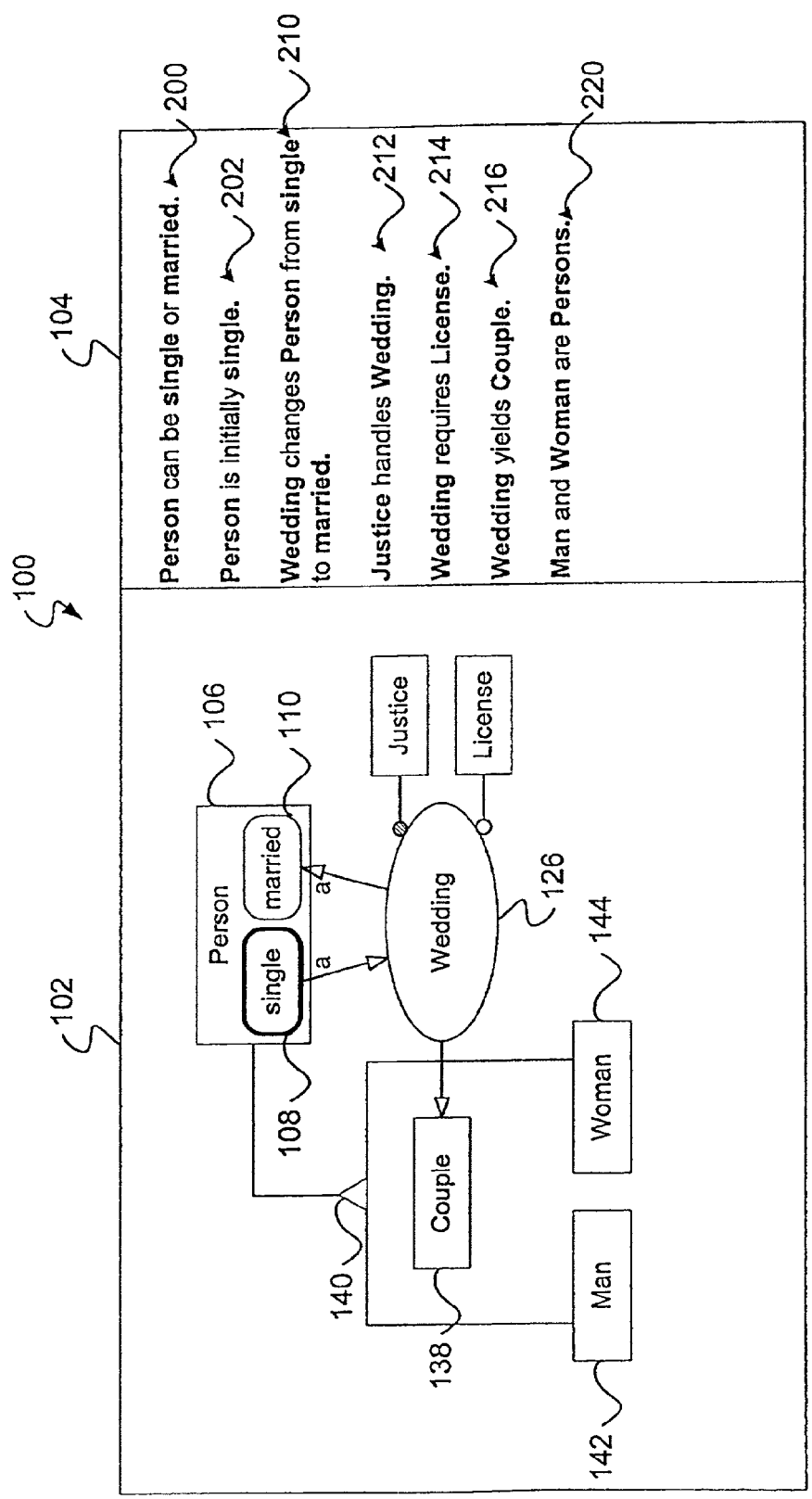

Returning to the design of the wedding system model, generally, a wedding joins a man and a woman. As shown in FIG. 7, OPM provides a graphic element 140 that enables specification that "Man" 142 and "Woman" 144 objects constitute "specializations" of a "Person" object 106. That is, much like class inheritance in object-oriented methodologies, a diagram can specify that both the "Man" 142 and "Woman" 144 objects share the attributes associated with the "Person" object 106, though the "Man" 142 and "Woman" 144 objects may differ in other ways. For example, while both "Man" 142 and "Woman" 144 objects have "single" 108 and "married" 110 states inherited from the "Person" object 106, a "Man" object 142 may have a "Best Man" object (not shown) while a "Woman" object 144 may have a "Bridesmaid" object (not shown).

As shown, OPM depicts the "specialization" symbol 140 as a hollow triangle. The text sentence 220 associated with the specialization includes the reserved term "are", as in "Man and Woman are Persons," 220. The text sentence 220 also illustrates that the tool can pluralize words as contextually needed. For example, a sentence of "Man and Woman are Person" is both awkward and grammatically incorrect. Thus, the tool pluralizes the object label "Person" by adding a "s" suffix. The tool can maintain a dictionary for words not pluralized by convention "s" and "es" suffixes (e.g., "goose" pluralized is "geese").

OPM provides not only for specializations of objects, but also specializations of processes. For example, "Secular Wedding" and "Religious Wedding" (not shown) could be specializations of the process "Wedding" just as "Man" and "Woman" are specializations of the object Person.

Figure 8:
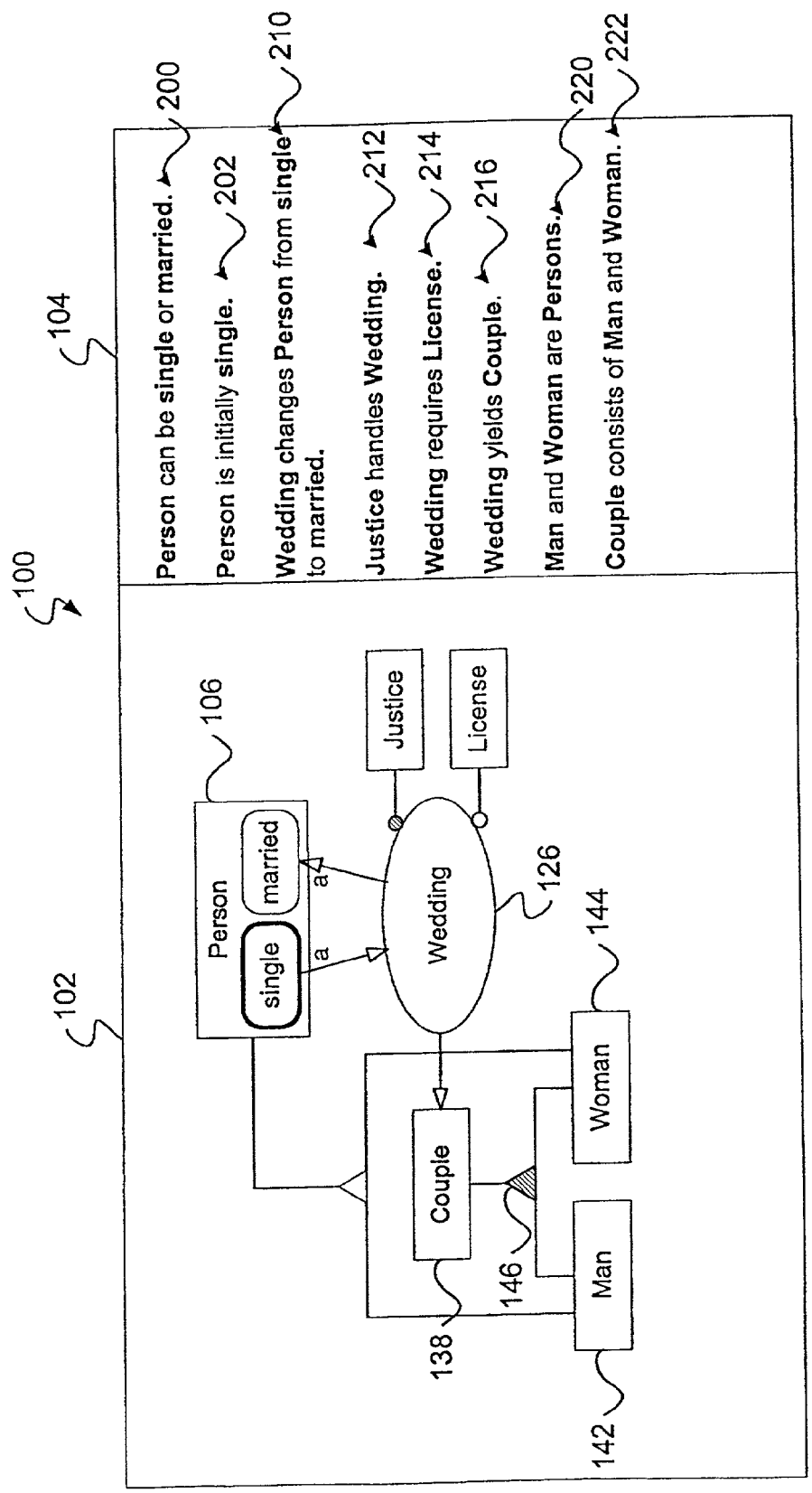

In addition to representing specializations of a generic person, a couple typically includes a man and woman. FIG. 8 illustrates an "aggregation-participation" symbol 146, a blackened triangle, identifying parts of an entity. For example, the symbol 146 identifies a "Couple" object 138 as the aggregation of "Man" object 142 and "Woman" object 144 participants. Again, the corresponding text plainly identifies this relationship with the text "Couple consists of Man and Woman" 222. Alternatively, to avoid confusion with UML notation, a blackened diamond may be used instead of blackened triangle 146.

Figure 9:
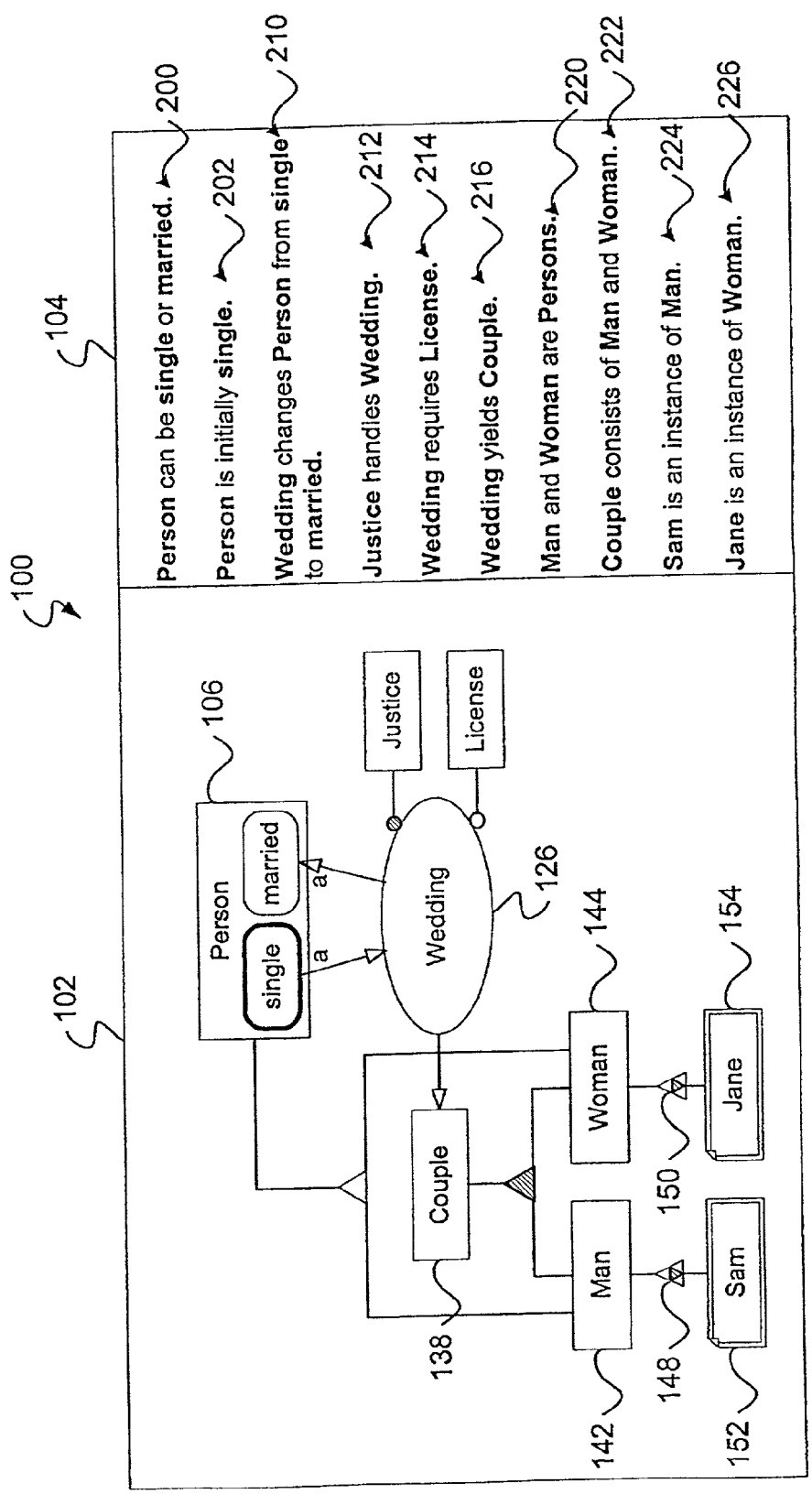
Figure 10:
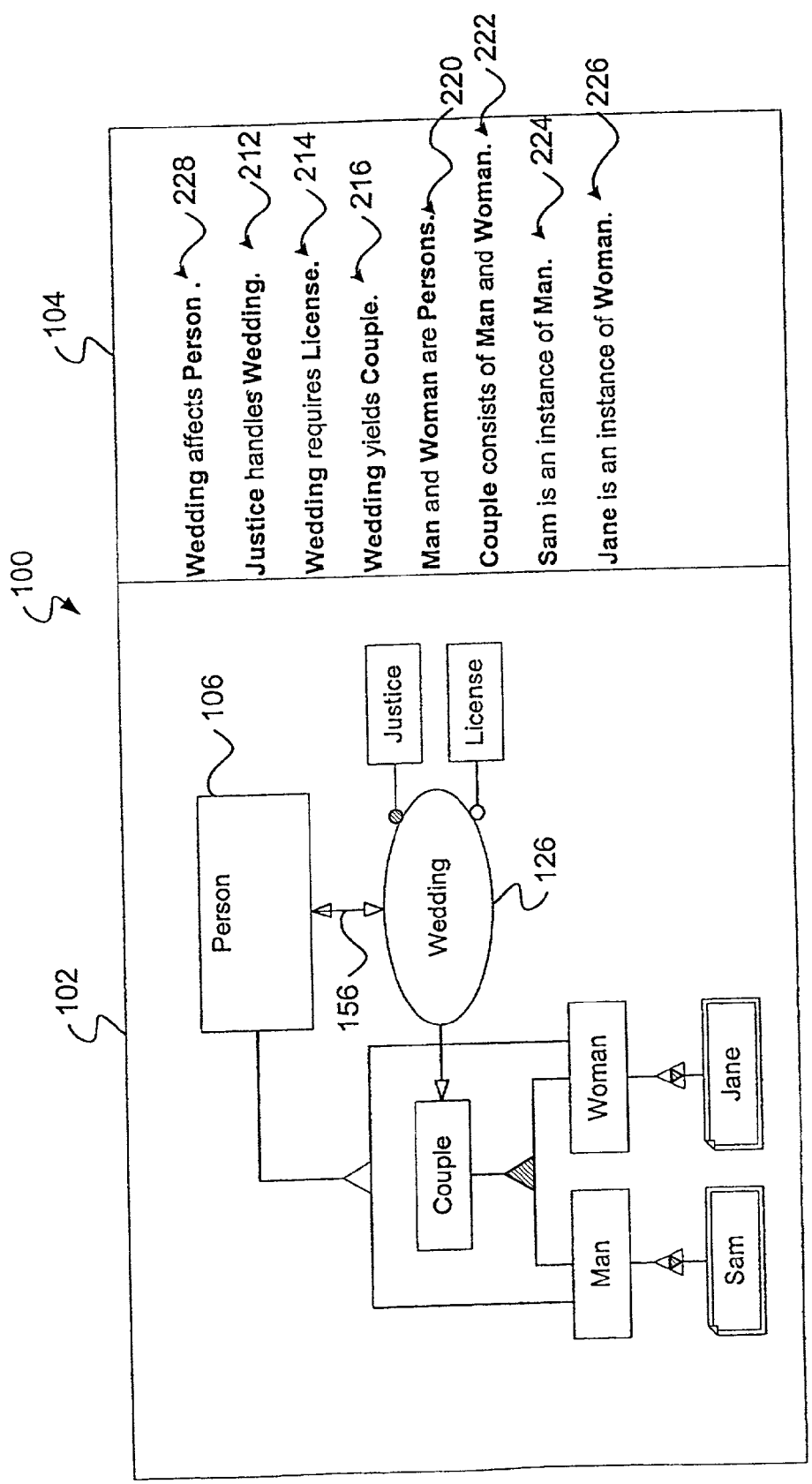

FIG. 9 uses a "classification-instantiation" symbol 148, 150, a dark inverted triangle within a hollow outer triangle, to identify "Sam" 152 and "Jane" 154 objects as instantiations of a "Man" 142 and "Woman" 144 respectively. That is, "Sam" 152 and "Jane" 154 share the attributes of "Man" 142 and "Woman" 144 objects, respectively. The sentences 224, 226 corresponding to the symbol 148, 150 feature the reserved words "is an instance of" as in "Sam is an instance of Man." 224.

OPM can distinguish between physical and informatical things. Shadowed (3-dimensional) or double-bordered boxes and ellipses denote physical objects and processes, respectively. As shown, the "Sam" 152 and "Jane" 154 objects both appear as double-bordered rectangles. An "informatical" entity conceptually exists independently of its physical embodiment. For example, a song remains the same whether scored on music sheets or recorded on vinyl. Thus, a song is an informatical entity. However, physical entities, such as a rock or body, do not have existence separate from its physical, space-occupying form. In practice, system designers often ignore this distinction and use the single bordered informatical graphic symbols for informatical and physical entities alike. OPM, nevertheless, provides such symbols if needed. In addition to its usefulness as a modeling symbol, this enables the separation of sentences that need to be coded from those that do not (e.g., hardware portions of a system).

As shown, an instance of an object 152, 154 is denoted as a rectangle with a truncated upper left corner. Likewise, an instance of a process is denoted as an ellipse with a small part of its left part truncated (not shown). This provides a distinction between a thing (object or process) and its instances when an attachment between the instance and thing does not appear or has not yet been established.

FIG. 9 completes an initial high-level diagram of a wedding system model. However, extensive diagramming can quickly introduce a confusing degree of clutter into a diagram. To ease complexity management, the tool provides different features that enable a designer or user to balance the level of detail revealed by a diagram against diagram simplicity and clarity. The diagrams representing these different levels of detail collectively represent the system as a whole.

Again, the system provides many different complexity management features for use at a user's discretion, for example, when a diagram appears too populated with objects, processes, and links. The complexity management features include state suppression/revelation, in-zooming/ out-zooming, and folding/unfolding (described below). After using a complexity management feature such as a scaling feature, the tool presents a new depiction showing more or fewer details.

As stated above, the system provides a "state suppression/revelation" mechanism where state suppression hides object states and state revelation reveals them. For instance, in FIG. 10, a user has specified suppression of states of the "Person" object 106. That is, the tool suppresses depiction of the "single" and "married" states (108, 110) within the "Person" object 106. Additionally, the tool replaces the input 122 and output 124 links with an "effect" link 156. The tool depicts an "effect" link 156 as a line linking the affecting process with that affected object that terminates with hollow arrowheads on both ends. The effect link 156 represents some unspecified effect the process 112 has on the object 106. Correspondingly, instead of specifying the exact nature of change, the text merely states that "Wedding affects Person." 228.

It should be noted that a user can add an effect link 156 without suppressing object states. For example, the effect link 156 may appear in the graphic element palette. This is useful when the states of an object are known but it has not yet been determined how exactly the affecting process changes the states of the affected object.

The tool can enable a user to toggle between suppressed or revealed states of an object, for example, by double-clicking or right-clicking on the object. Similarly, entering text of "Suppress States of Person" or "Reveal States of Person" in a command window may perform the same task. Additionally, using similar techniques, a user may suppress or reveal the states of one, several, or all objects in a diagram.

Figure 11:
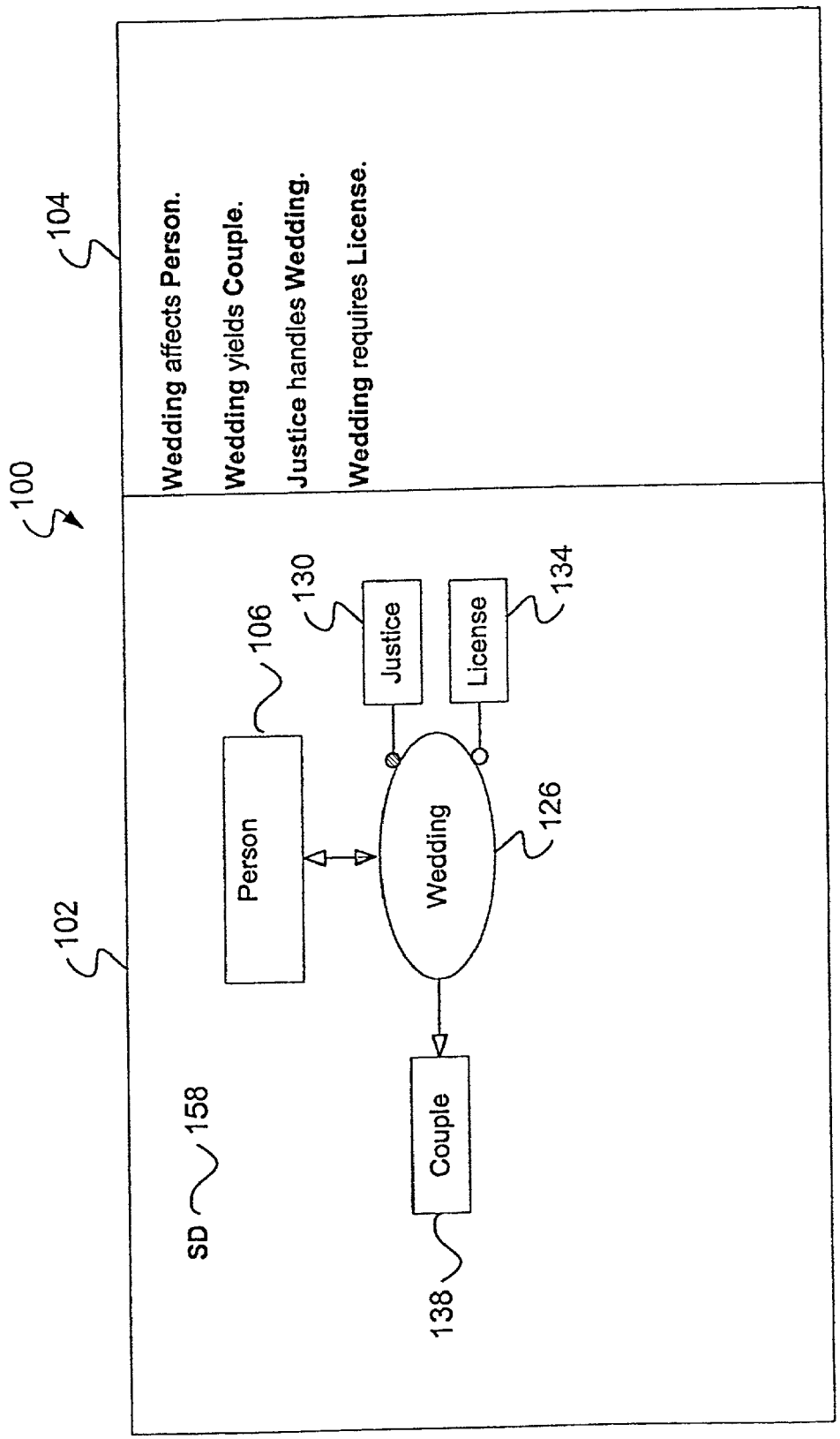

In addition to state suppression/revelation, the tool may provide users with the ability to "zoom" into and out-of particular elements. To illustrate, FIG. 11 depicts a simplified version of the wedding system model, labeled "SD" 158, that offers a concise, high-level presentation of major model objects, processes, and agents. The model of FIG. 11, however, lacks detail of how the "Wedding" process 126 operates.

Figure 12:
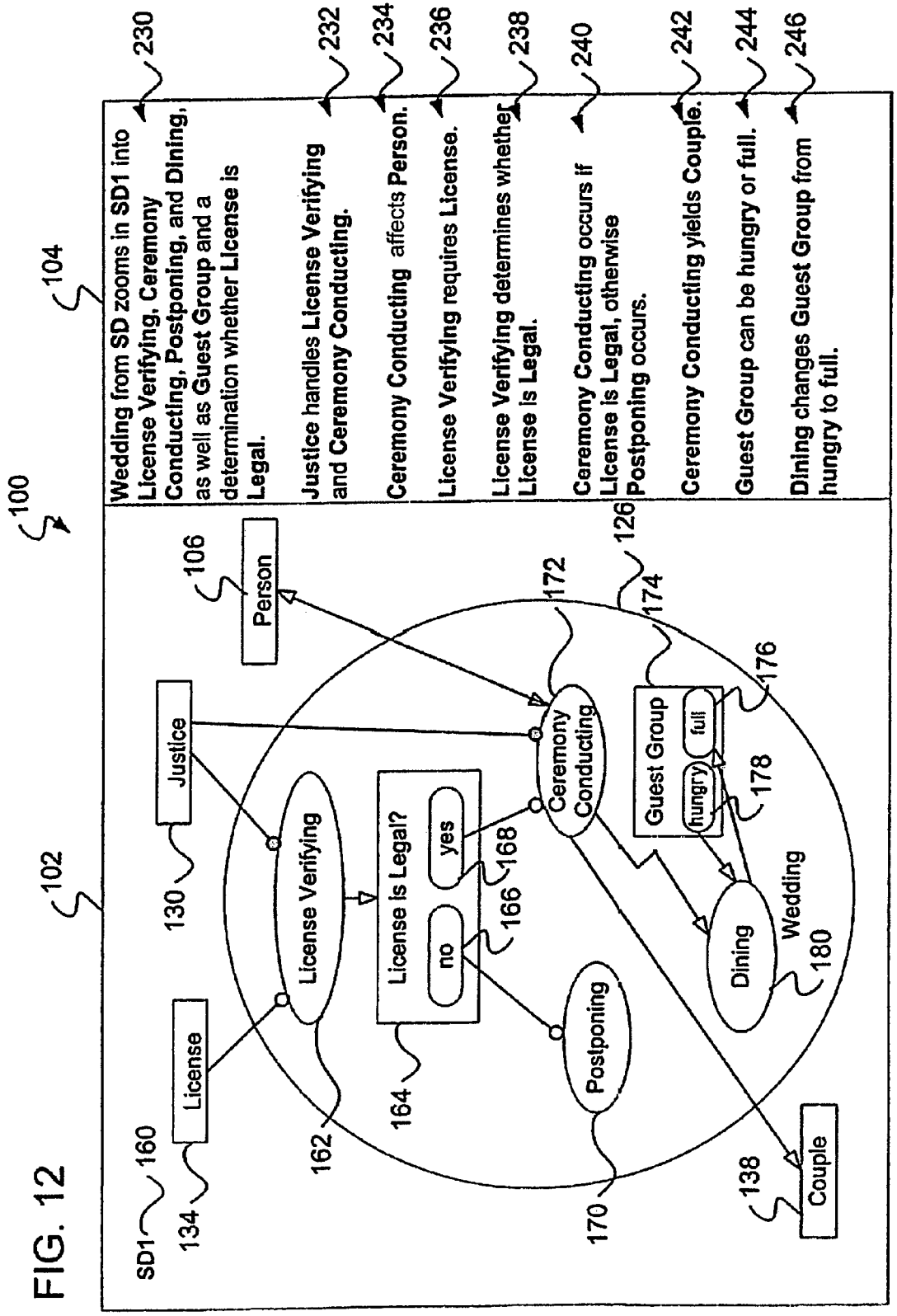

FIG. 12 depicts the internal workings of the "Wedding" process 126 in a diagram labeled "SD1" 160. As shown, the process 126 encapsulates a number objects 164, 174 and processes 162, 170, 180. Again, as processes and objects stand on equal methodological footing, either a process or an object may encapsulate the other. While FIG. 12 depicts objects 164, 174 and processes 162, 170, 180 not shown in FIG. 11, the two FIGS. are entirely consistent and merely differ in their level of detail. For example, links present in the higher level diagram (FIG. 11) also appear in the more detailed diagram (FIG. 12) though the links may connect to lower-level objects and/or processes displayed.

A user can navigate from the high level diagram of FIG. 11 to the detailed presentation of the "Wedding" process 126 in FIG. 12 by in-zooming (i.e., zooming-into) the "Wedding" process 126. Likewise, a complementary "out-zooming" out of the "Wedding" process, can navigate a user from the detailed "Wedding" process 126 diagram, SD1, back to the high-level diagram, SD. Thus, instead of a planar diagram, an OPM model has recursive depth. That is, a user could further zoom into the "License Verifying" process 162 to define or observe elements encapsulated by the process 162. In technical terms, a model forms a graph where each node is a diagram and each edge is a directed arc denoting a relationship between the diagrams.

Comparing FIGS. 11 and 12 illustrate the increased detail revealed by the "in-zooming". For example, in addition to the encapsulated entities 162, 164, 170, 172, 180, FIG. 12 depicts the links from the "Justice" agent 130, License 134 instrument, "Person" object 106, and "Couple" object 138 as extending particular "Wedding" process 126 elements instead of terminated at the process 126 perimeter. However, after out-zooming, for example, from FIG. 12 to FIG. 11, the tool again shows the links extending to the perimeter of the "Wedding" process 112.

As depicted in FIGS. 11–12, the script window 104 presents the text corresponding to the diagram currently displayed by the workspace 102. Additionally, as shown in FIG. 12, a "zoom" sentence 230 identifies the entities encapsulated by the "Wedding" process 126 to preserve the hierarchy of detail for later use.

In greater detail, the "Wedding" process 126 includes "License Verifying" 162, "Postponing" 170, "Ceremony Conducting" 172, and "Dining" 180 processes. In general, in OPM, control flows from top to bottom. That is, the relative positioning of the processes indicates that the "License Verifying" process 162 should occur prior to any of the other processes. Processes appearing at the same horizontal level indicate processes that can, potentially, proceed in parallel.

The "Wedding" process 112 includes an object 164 labeled "License is Legal?". The question mark indicates that the object 164 constitutes a Boolean object. A Boolean object has two mutually exclusive states 166, 168. A link 160 from the "License Verifying" process 162 to the "License is Legal?" object 164, again, features a line terminating in a hollow arrowpoint. In this context (i.e., a link from a process 162 to a Boolean object 164), however, the link specifies that the process 162 determines the state 166, 168 of the Boolean object 162 as reflected in the corresponding text "License Verifying determines whether License is Legal" 238.

Another link connects the "yes" state 168 of the "License is Legal" Boolean object 164 to the "Ceremony Conducting" process 172. A similar link connects the "no" state 166 to the "Postponing" 170 process. Like "instrument" links, the links terminate in hollow lollipops. In the context of connecting states to processes, the links form flow-of-control "conditional" links. Additionally, since the "License is Legal?" Boolean object 164 can only be in one state at a time, the links represent mutually exclusive conditions. The relationships established by these links are appropriately explained by the corresponding text 240, "Ceremony Conducting occurs if License is Legal, otherwise Postponing occurs". In programming language terms, the above is an "if-then-else" type statement. A diagram, or the corresponding text, can also specify other flow-of-control constructs. For example, a user can construct a "case" statement construct by including more than two states, each being a condition for triggering a process.

Again, as described above, a user can zoom-into and out-of diagram elements. For example, double-clicking the "Wedding" process 126 in FIG. 11 causes the tool to replace the high level diagram with the more detailed display of FIG. 12. However, the tool may provide other navigation mechanisms.

Figure 13:
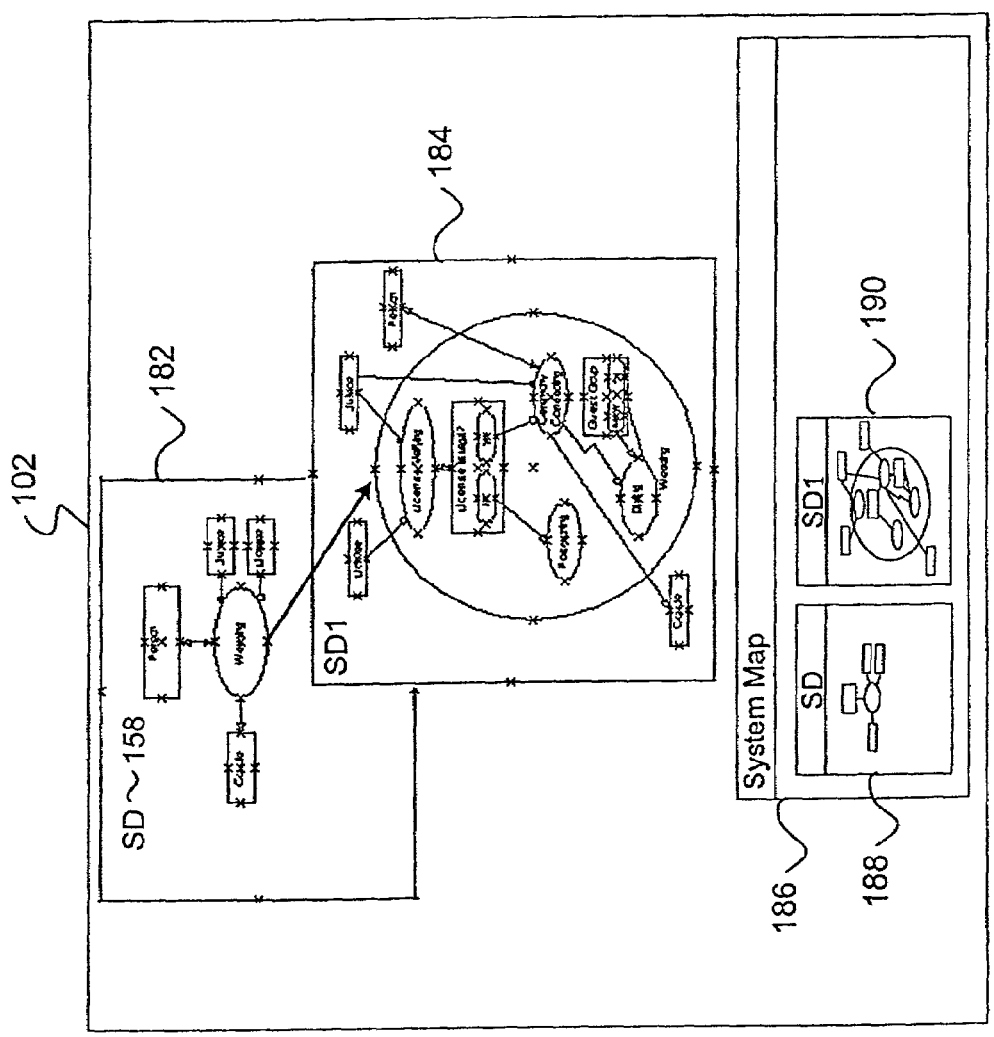

For example, the tool can present multiple diagrams of a system model simultaneously. For example, FIG. 13 illustrates simultaneously presented diagram windows of the high-level model diagram 182 shown in FIG. 11 and the more detailed diagram 184 of the "Wedding" process shown in FIG. 12. The different windows need not be separate diagrams. For example, one window may include a diagram with suppressed states while a different window shows the same diagram with revealed states. Per a user's request or query, the tool can generate a new diagram that combines information about a particular subset of objects and/or processes from several different diagrams.

The tool may also present a system map window 186 that can be shown or hidden. As shown, the map 186 presents "thumbnails" 188–190 of different model diagrams. Selecting one of the "thumbnails" 188–190 causes the tool to present the selected diagram in the workspace 102. The map 186, thus, provides easy navigation among the, potentially, numerous diagrams in a diagram set and allows a user to see the "big picture" while looking in greater detail at some portion of the system.

In addition to the complexity management features illustrated above, the tool also provides a folding/unfolding feature that remove/reveal aggregation, specialization, exhibition, and instantiation symbols and related entities (e.g., "sub-objects" aggregated by another object).

Again, the design example above illustrated relationships provided by the tool and OPM. Additionally, the tool and OPM also allow a user to define a relationship between entities of their own creation. For example, FIGS. 14–16 show user defined relationships between a "Mother" object 300 and a "Child" object 302.

Figure 14:
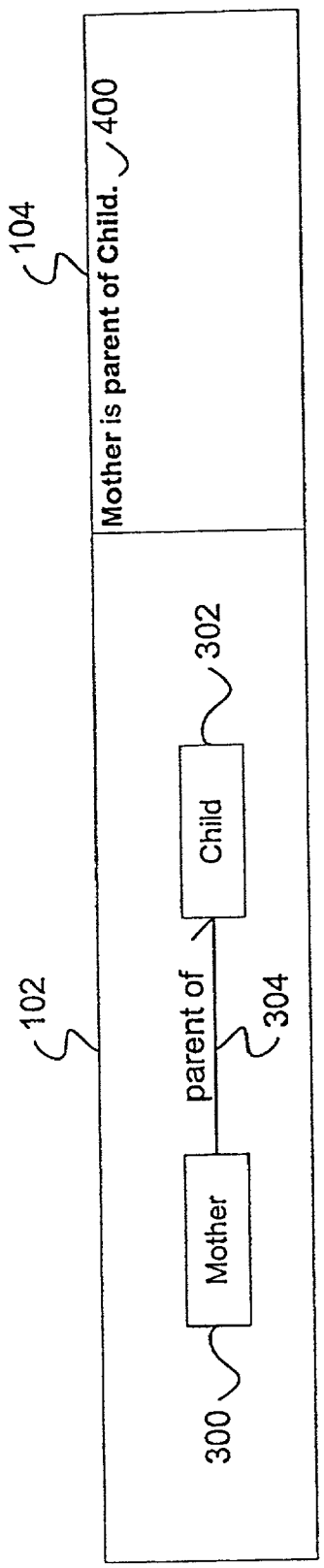

In greater detail, FIG. 14 illustrates a link 304, known as a "unidirectional structural link", extending from a source "Mother" object 300 to a destination "Child" object 302. The link 304 label, "parent of", expresses the relationship between the objects 300, 302. The link 304 shown features a line terminating in a "half", harpoon-shaped, arrowhead. The "half" arrowhead identifies the link 304 as a "forward" link. That is, the label describes the relationship of the source object 300 to the destination object 302, relative to the source object 300. For example, as indicated by the corresponding text sentence 400, the "Mother" is parent of Child".

Figure 15:
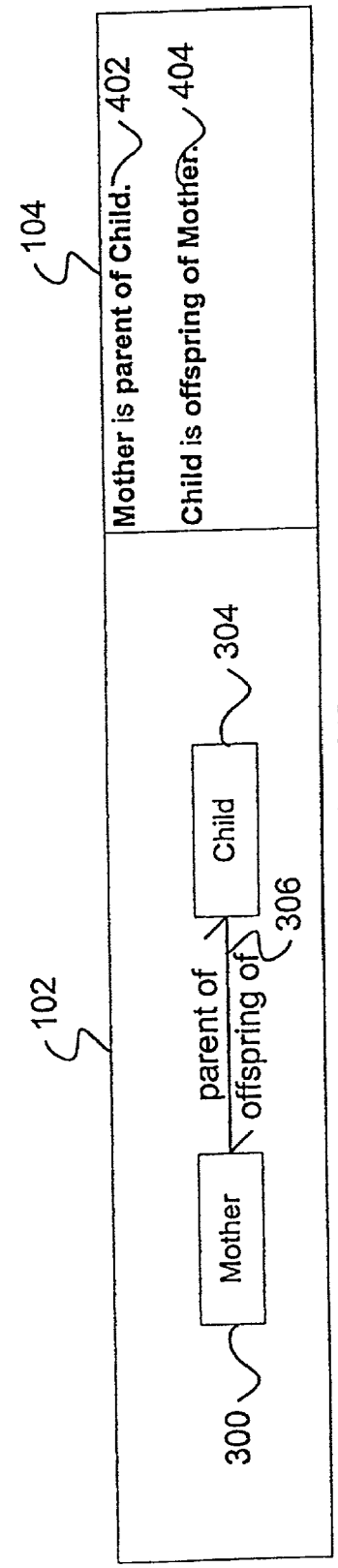

FIG. 15 illustrates a bi-directional structural link 306. As shown, the link 306 is essentially two opposite oriented unidirectional structural links combined. The two labels correspond to forward and backward relationships, respectively. As expressed by the corresponding text, the link 306 corresponds to two different text sentences 402, 404. Namely, "Mother is parent of Child" 402 and "Child is offspring of Parent." 404.

Figure 16:
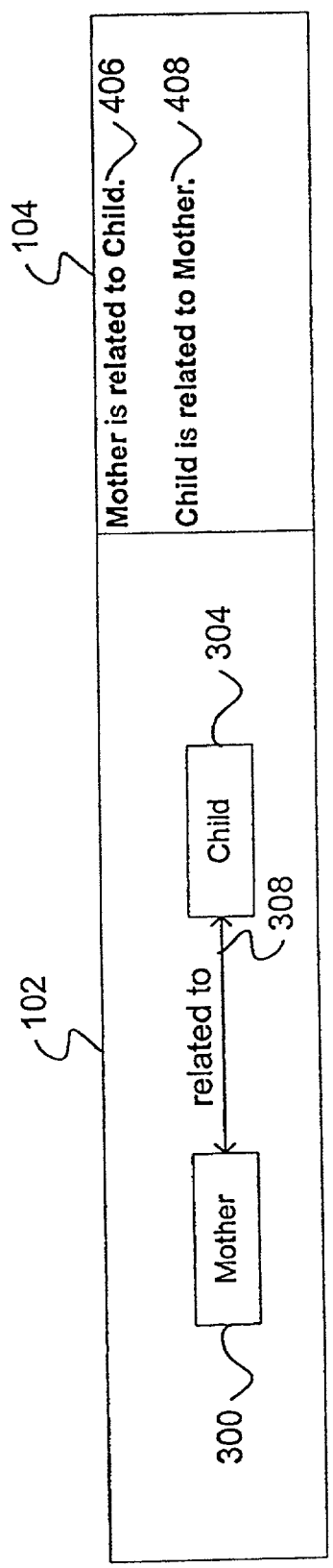

FIG. 16 illustrates yet another kind of structural link 308 that expresses a "homologous" or mutual relationship. That is, the same relationship holds in both the forward and backward directions. As shown, the tool depicts the link 308 as a line terminating in arrows on both ends. This link 308 corresponds to a text sentence for the forward direction ("Mother is related to Child" 406) and the backward direction ("Child is related to Mother" 408).

Figure 17:
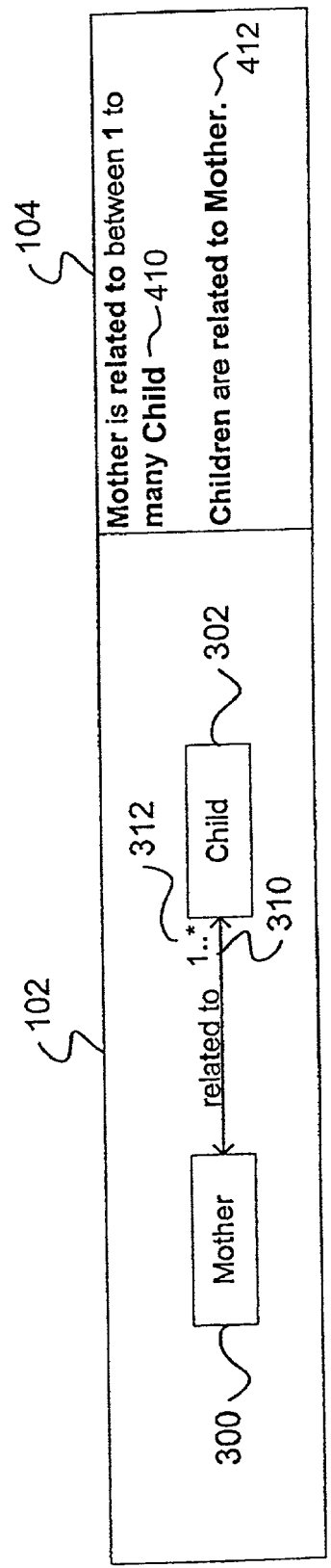

By default, structural relationships form a one-to-one relationship, however, structural relationships, particularly in database schemas, often form one-to-many, many-to-one, and many-to-many relationships. As shown in FIG. 17, a user has annotated a homologous structural link 310 to identify a number of "Child" objects 302 related to the "Mother" objects 300. As shown by the corresponding text, the "*" in the "1 . . . *" range 312 stands for the reserved word "many" where many represents an integer greater than 1, as in "Mother is related to one or more Children".

The number of "Child" objects 302 need not be a range. For example, a user may simply specify a number (e.g., 3) or parameter (e.g., "n"). Additionally, either end of structural link may specify cardinality.

Figure 18:
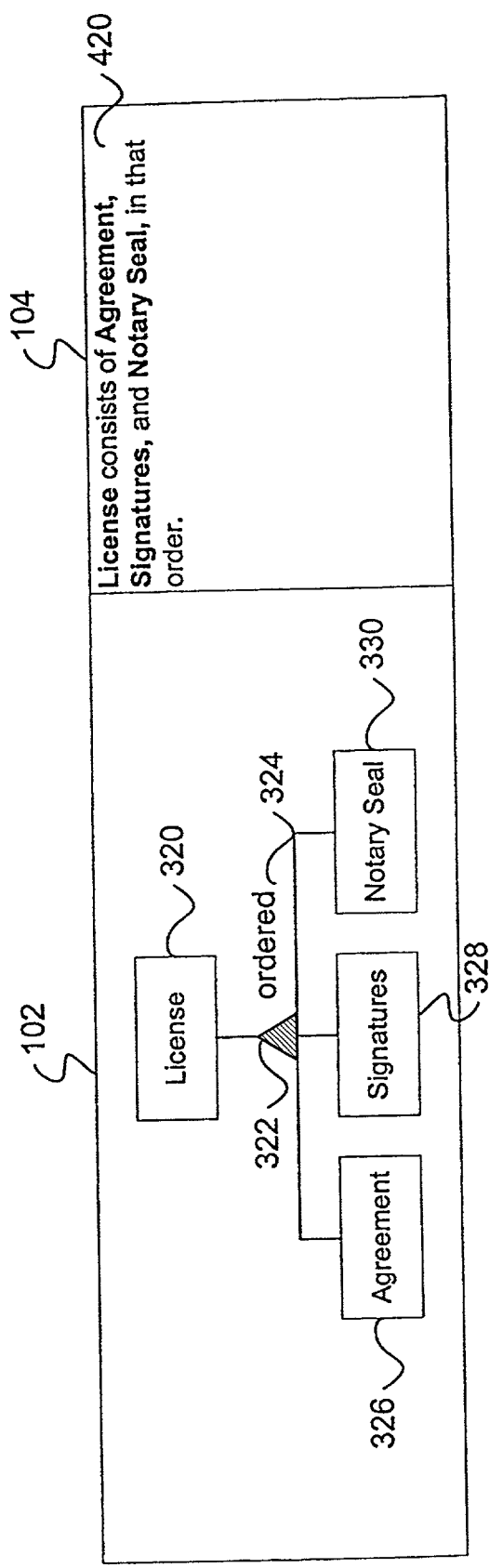

As shown in FIG. 18, other symbols may feature annotations. For example, a user has annotated the "aggregation" symbol 322 with the reserved term "ordered" 324. This annotation indicates that the left-to-right sequence of sub-parts 326–330 of the "License" object 320 express an ordering. The corresponding text expresses this relationship as "License consists of Agreement, Signatures, and Notary Seal, in that order" 420.

Figure 19:
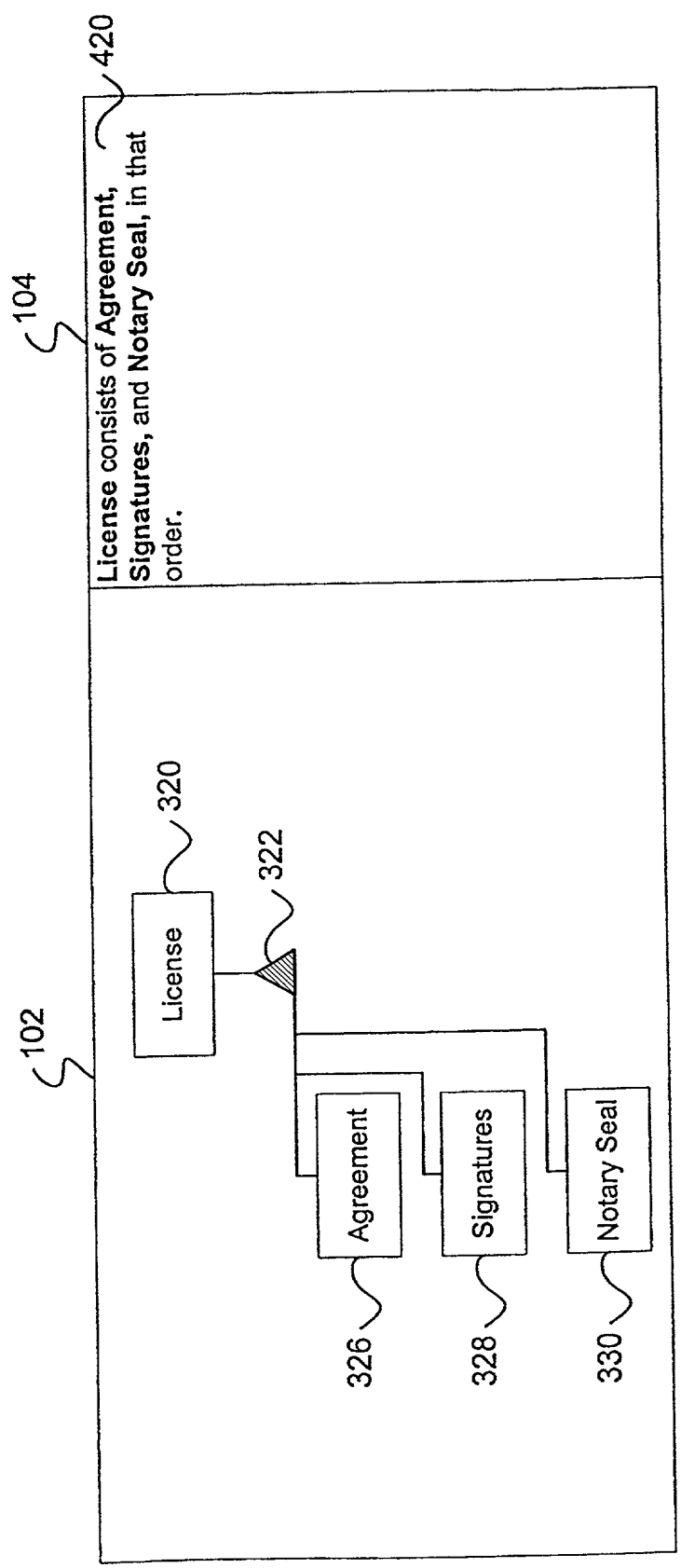

As an alternative to intricate annotations, OPM and the tool provide a diagrammatic way of expressing relationships to, potentially, reduce diagram congestion. For example, as shown in FIG. 19, instead of an annotation, a user can specify an ordering by "stacking" sub-parts vertically. As the diagrams of FIGS. 18 and 19 are exactly equivalent, the diagrams share the same text 420.

Figure 20:
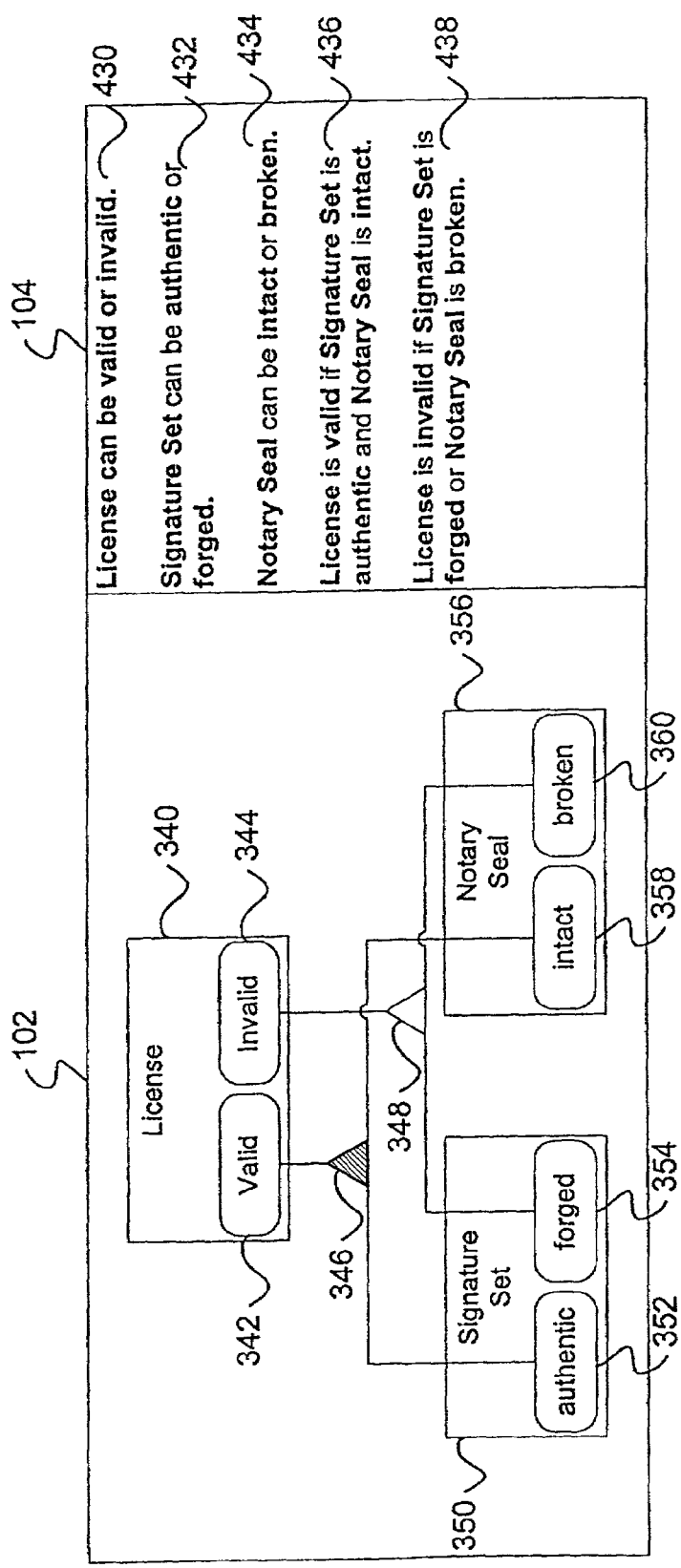

As described above, OPM provides a number of different ways of expressing system logic. In addition, OPM also enables a designer to express Boolean logic or a "compound condition". As shown in FIG. 20, To define these relationships, OPM again uses the blackened 346 and hollow 348 triangles. In the context of connecting object states, however, these symbols represent Boolean AND and OR operations respectively. That is, as expressed by the corresponding text 436, symbol 346, connecting states 352 and 358 to state 342, expresses that the "License" object 340 "Valid" state 342 is the Boolean ANDing of the "Signature Set" Boolean object 350 "authentic" state 352 and the "Notary Seal" Boolean object 356 "intact" state 358.

Figure 21A:
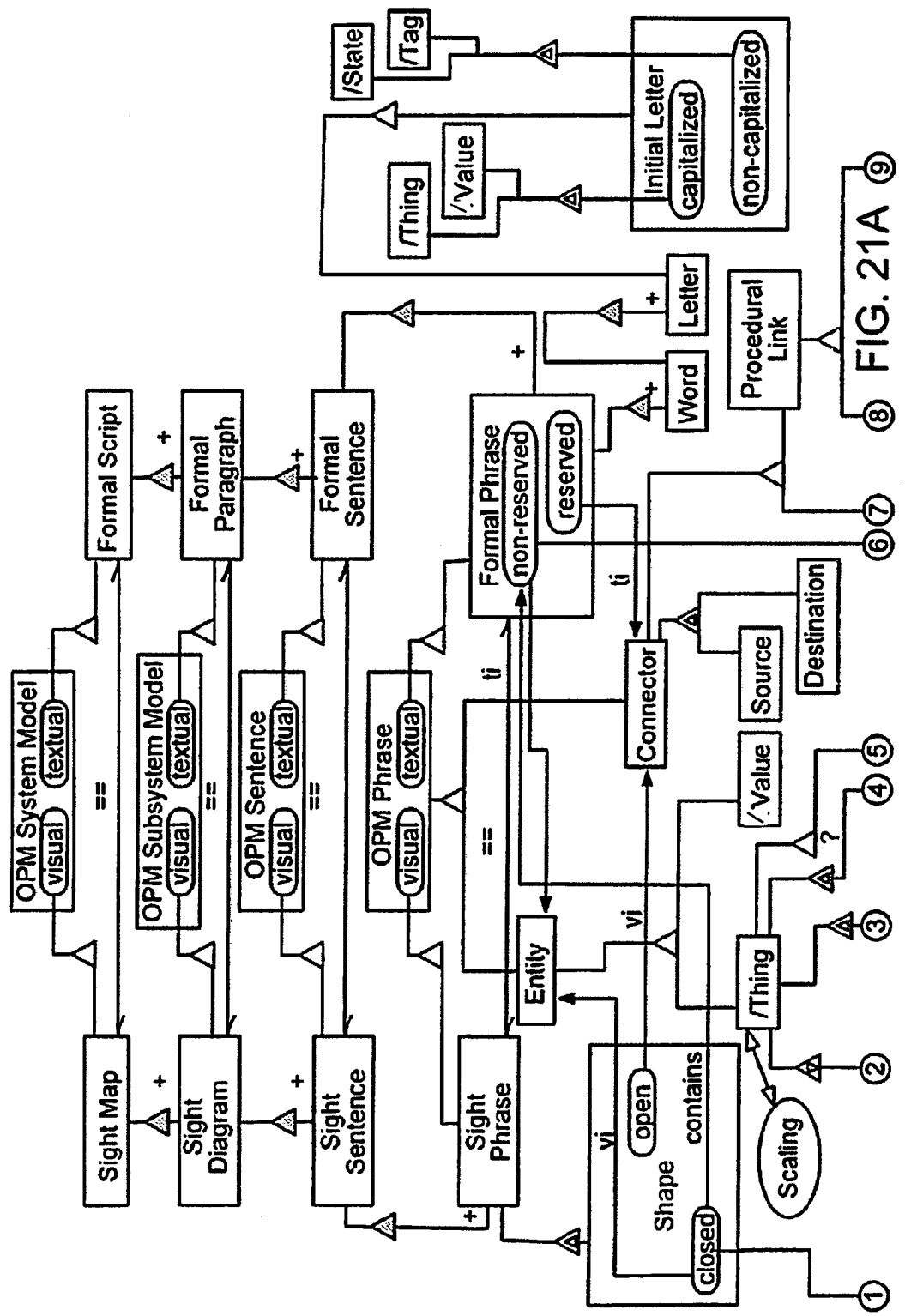
FIG. 21 is an OPM (Object Process Methodology) diagram illustrating OPM.
Figure 21B:
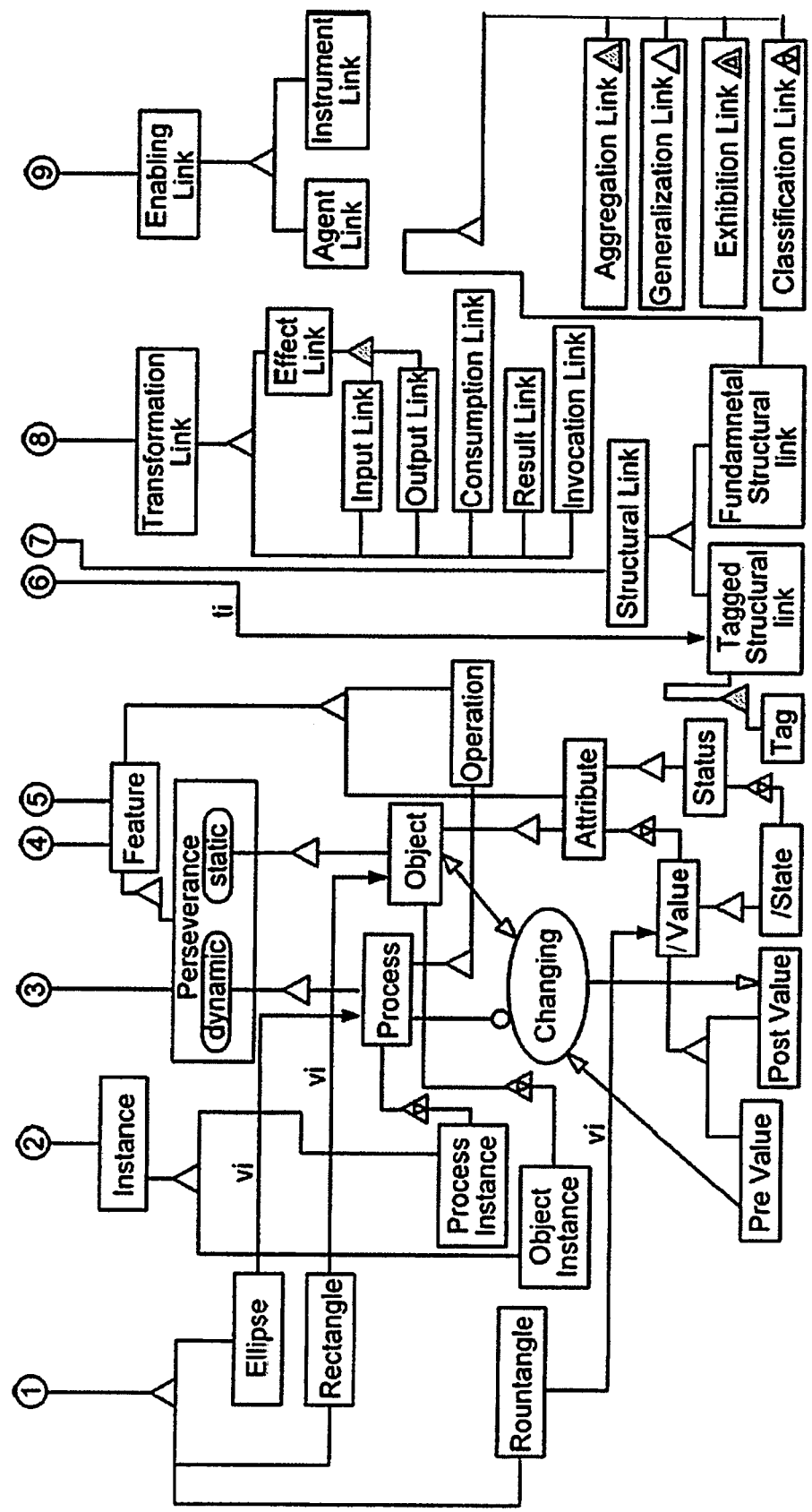

Again, the tool and OPM can model a wide variety of systems. In fact, OPM & OPL can completely specify themselves. For example, FIG. 21 illustrates an OPM diagram of OPM/OPL. FIGS. 22 and 23 list a corresponding OPL description of OPM/OPL. This reflective meta-modeling enables rapid modification of OPM and OPL. For example, after coding a first generation of OPM/OPL that can automatically generate instructions for a system, an existing generation of the OPM/OPL system can generate future generations of OPM/OPL to reflect enhancements and other changes.

Automatic generation of future versions of OPM/OPL illustrates the flexibility and extensibility of OPM/OPL design. On a less grand scale, the tool may provide a "learning mode" that enables a user or group to define their own symbols and sentences. For example, in the vertical domain of a continuous chemical process industry one may define a "sampling" relation shaped like a triangle within which a pie is drawn with a slice taken out of it. This slice symbolizes the sample, which is a small amount of a large lot that is analyzed for exact composition. The resulting composition is also the composition of the large lot, with its amount practically unchanged. An example sentence would be "Sample represents Mixture." Here, "represents" is the reserved phrase analogous to "consists of" for the aggregation-participation relation.

Figure 24:
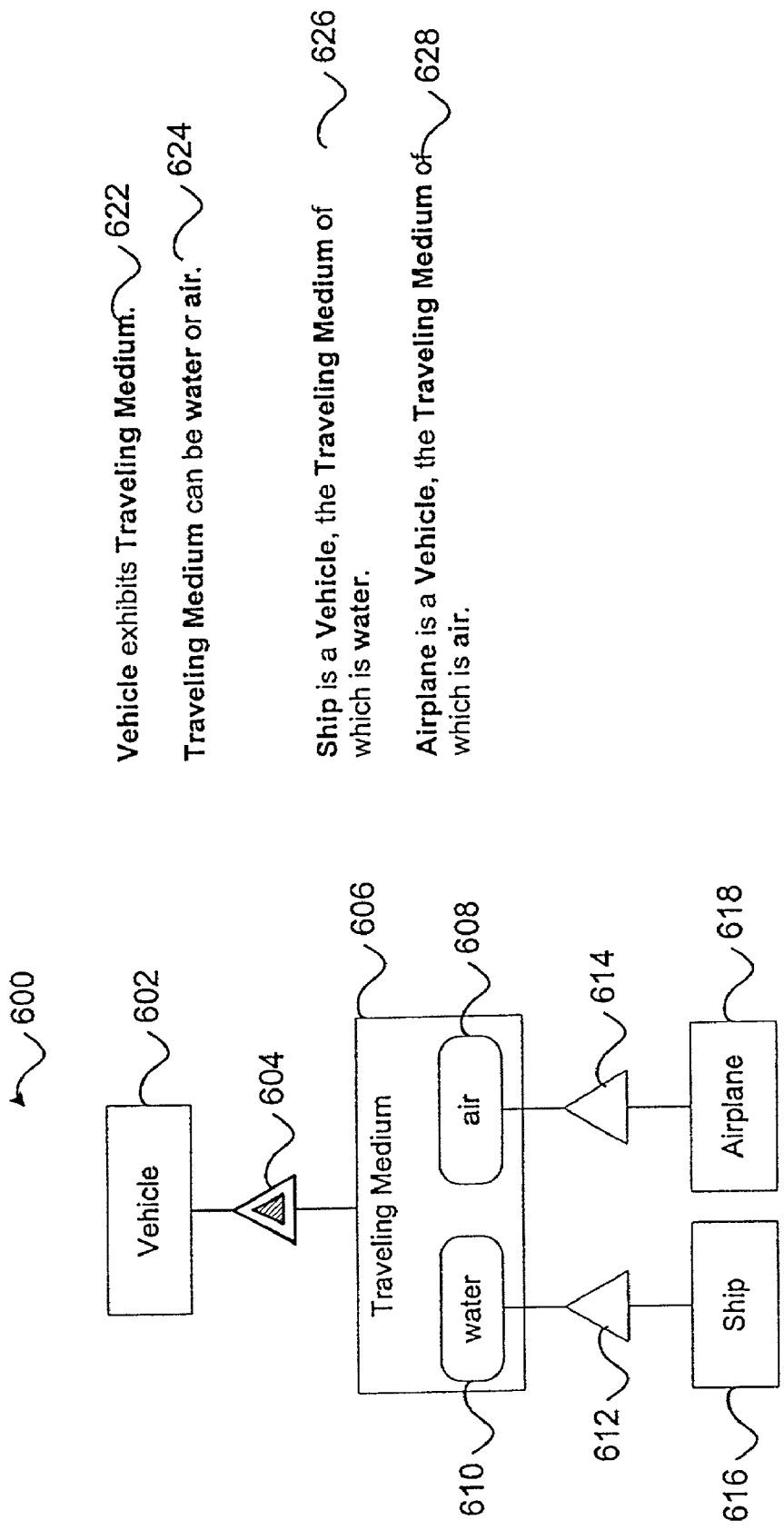
FIG. 24 is a diagram illustrating a learning mode of the modeling tool.

FIG. 24 illustrates an example of a learning mode. As shown, the tool allows a user to construct a diagram. For example, as shown, the user has drawn a diagram showing that a "Vehicle" 602 exhibits 604 a "Traveling Medium" 606 of either "water" 610 or "air" 608. Text sentences 622, 624 also describe this configuration.

The user also linked a "Ship" object 616 to the "water" state 610 and an "Airplane" object 618 to the "air" state 608 via hollow triangles 612, 614. As described above, hollow triangles 612, 614 represent specialization when connecting things or Boolean "OR"-ing when connecting object states, however, in learning mode the tool may temporarily permit different constructs. After diagramming, the user can enter a text sentence 626 corresponding to the diagram. Similarly, after entering a new type of sentence 626, the user can draw the corresponding diagram 600. By identifying reserved words entered by the user and identifying element labels, the tool can store a diagramming configuration and the corresponding sentence syntax, for example, by automatically generating new production rules. Thus, the tool can learn a new configuration of model elements and their corresponding new sentence. Thereafter, upon detecting a diagram construct, the tool can generate a sentence in accordance with the newly defined syntax. Similarly, upon detecting a text sentence having the newly defined syntax, the tool can generate the corresponding diagram. Thus, the learning mode gives a user flexibility in using the tool to express new modeling constructs and concepts. Use of the learning mode may not be available to all users, and may be restricted to experts.

OPM can also offer temporal features, for example, for specification of systems that exhibit complex dynamic behavior involving time constraints. For example, real-time systems often handle issues like concurrency, synchronization among processes, and expression of events, conditions, and timing constraints. OPM provides graphic and text constructs to include these features in a model.

Figure 25:
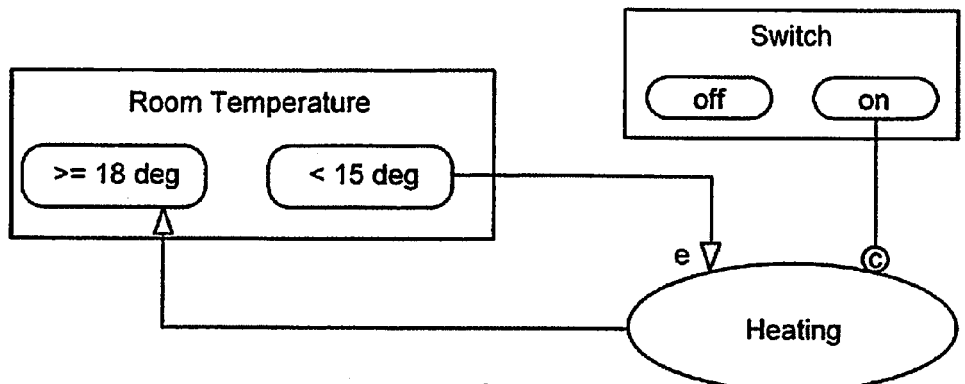

Referring to FIG. 25, triggering events and guarding conditions are specified by attaching the letters e and c, respectively, to process links which link the triggering or guarding thing (i.e., object or process) to the triggered or guarded process. A triggering event can take the form of an external event, a state-entrance event, a state-change event, a value-change event, a clock event, a process-termination event, and a timeout event. For example, FIG. 25 illustrates that a "Heating" process takes place upon the occurrence of a state-entrance event, in which "Room Temperature" enters a state of being below "15 deg". "Heating" occurs if, and only if, the guarding condition requiring that the "Switch" object remain at state "on".

OPM also permits representation of temporal constraints and timing exceptions. Temporal constraints are minimum and maximum time bounds on a time interval. Temporal constraints include a process duration constraint (a constraint on the time spent in executing a process), a state duration constraint (a constraint on the duration of the time spent in an object's state), and a reaction-time constraint (a constraint on the time elapsed between a triggering event and the execution of the triggered process). In addition to minimum and maximum time constraints, a probability distribution function can be specified and used for purpose of simulating the entire system. Each entity (object, process, or state) is associated with a multimedia object (image, video clip, audio file, CAD drawing, 3-D hologram, line drawing, schematic, etc.) that goes in action when its time of execution or creation or destruction comes. Hence, OPM allows for vivid simulations.

Temporal constraints are attributes of the process or state or transition. They can be expressed by the usual exhibition symbol or by specifying an interval, $T_{min} \ldots T_{max}$, where $0 \leq T_{min} \leq T_{max}$. $T_{min}$ and $T_{max}$ represent the lower and upper bounds of the interval, respectively.

Processes take time to execute, and states are situations at which objects exist for some period. To be able to specify the time executing a process and being in a state take, both processes and states have an implicit attribute called Duration, which is the amount of time it takes for a process to execute or for an object to be at a state.

Figure 26:
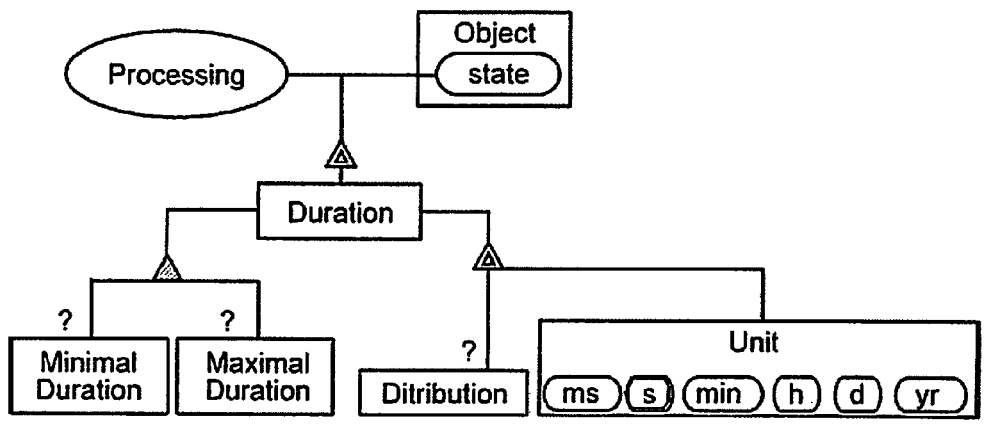

FIG. 26 is a meta-OPD specifying Duration as an attribute of both Processing and state of Object. Processing consists of an optional Minimal Duration and an optional Maximal Duration. Duration exhibits Unit, which can be millisecond (ms), second (s), minute (min), hour (h), day (d), or year (y). As indicated by the bold frame denoting the "s" state of Unit in FIG. 28, the default is "s", which stands for second units. Duration also exhibits Distribution, which can be any probability distribution with the parameters that are associated with it.

Figure 27:
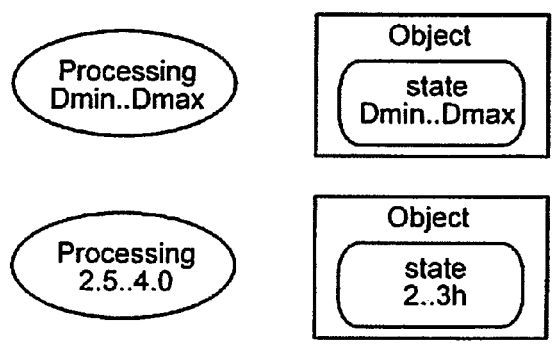

FIG. 27 shows the conventions of denoting minimal and maximal duration on process and state. Like participation constraints on objects, the minimal and maximal duration constraints are separated by two dots: Dmin . . . Dmax. The pair of numbers is recorded below the process or state name, followed by the unit, if it is different than second. The range Dmin . . . Dmax should be interpreted as a closed range, i.e., [Dmin . . . Dmax]. In a closed range, the lower and upper bounds are included in the normative range. Parentheses around the range indicate that the range is open, so the bounds are not included . Hence (Dmin . . . Dmax) means that if the process or being in a state takes less than Dmin or more than Dmax, then the exception process occurs.

FIG. 28 specifies in both graphics and formal English the meta-OPM definition of exception handling. The logical XOR relation between the conditions requiring that D<Dmin or D>Dmax, which is denoted by the tips of the two instrument links arriving at the same point along the Exception Handling process circumference.

Figure 29A:
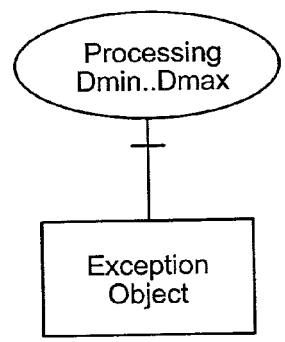

We can view the requirement that D be between Dmin and Dmax as one of the post-process conditions and abstract out the entire exception handling mechanism specified in FIG. 28. To do so, we introduce a special exception handling link, as described in FIG. 29. In FIG. 29(a) an exception object is generated as a result of Processing taking less more than Dmax. A timing exception is a violation of the lower or upper bound of a temporal constraint. A vertical line near the exception handling process end of the link denotes an "Upper Exception Link". A double vertical line near the exception handling process end of the link denotes an "Lower Exception Link". These exception links connect the process or state, the temporal constraint of which was violated,to the exception handling process.

Figure 29B:
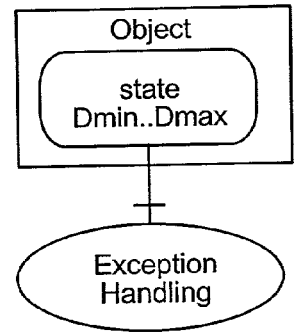

In FIG. 29(b) an Exception Handling process is invoked as a result of Object being in state more than Dmax. This procedural link is a line from the process whose time limits are specified to the exception object.

Figure 30:
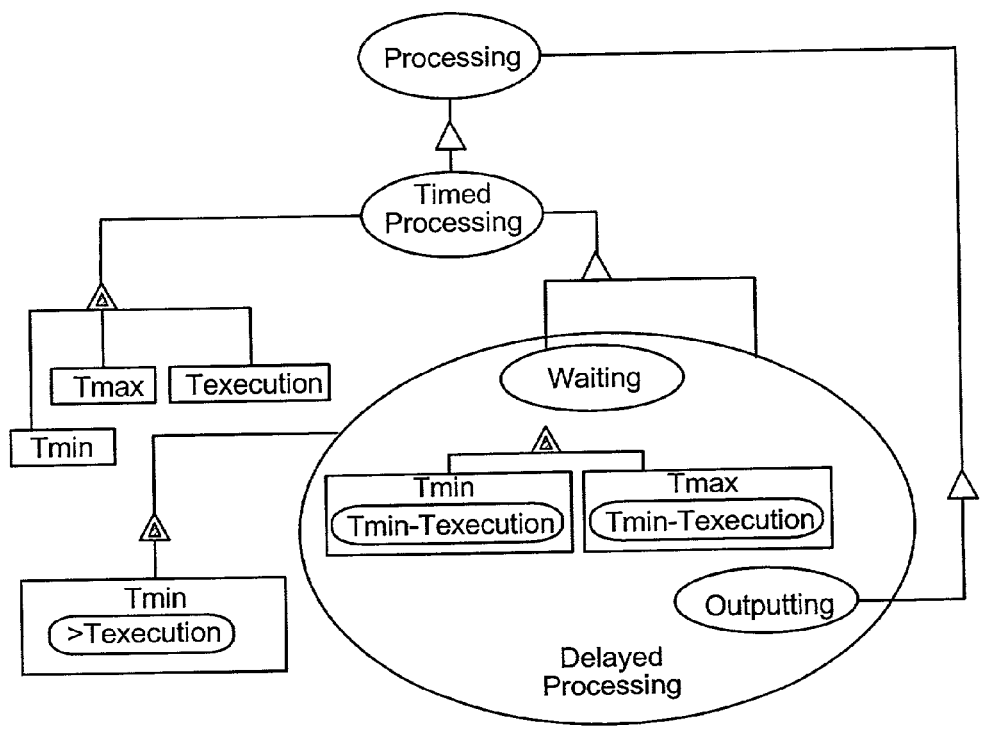

FIG. 30 depicts an OPM meta-model of temporal processing. The process class "Timed Processing", a specialization of the process class "Processing" (described below), features a minimum duration constraint $T_{min}$, a maximum duration constraint $T_{max}$, and an optional $T_{execution}$–the time it actually takes to execute the computational task within "Timed Processing". The temporal constraint of "Timed Processing" from which an exception link emanates is defined as a hard real-time constraint. Unlike a soft real-time constraint where violating the maximum timing does not prevent the process from terminating normally, if $T_{min} > T_{execution}$, the process should not terminate earlier than $T_{min}$ allows. The "Delayed Processing" process takes care of this. The "Delayed Processing" process includes "Waiting" and "Outputting" sub-processes. "Waiting" specializes "Timed Processing" by delaying its execution, such that it meets the minimal duration constraint. The minimal and maximal waiting times of "Waiting" are $T^w_{min} = T^w_{max} = T_{min} - T_{execution}$. The second sub-process, "Outputting" behaves like a regular, non-timed process if $T_{min} = T_{max}$, i.e., $T_{min}$ and $T_{max}$ of the parent "Timed Processing" are equal. Otherwise, the "Output" sub-process is itself a "Timed Processing" with a $T°_{min}=0$ and $T°_{max}=T_{max}-T_{min}$, i.e., its minimum duration constraint is zero and its maximum duration constraint is the difference between the maximum and minimum timing constraint of the parent process.

Before outputting its result, a "Timed Processing" for which $T_{max}<\infty$, i.e., one that has a non-infinite maximum timing constraint, checks whether this maximum timing constraint is met. If not, i.e., if the processing time exceeded $T_{max}$, then it does not output its result. If an exception link emanates from that process, a time exception event, i.e., an event signaling the exception of the maximum duration constraint, is registered.

Again, the temporal features described above have equivalent text (OPL) descriptions in accordance with production rules. For example, a triggering event sentence can take the form "Event event-name of type [event-type] triggers process-name <with a reaction time that is at least $T_{min}$ and at most Tmax>." This sentence specifies which event triggers the process process-name, and optionally, what the reaction time constraints are. As described above, OPM/OPL can model virtually any system. In addition to its usefulness as a modeling tool, the legibility and compactness of the OPL text description of a system enables smooth and direct transformation from original requirements all the way to executable code that materializes the system's functionality through software (e.g., C++, Java, or other software instructions), database schema definitions, and so forth. Not only is OPL more readable to non-programmer domain experts, but, due to its high level of abstraction, OPL is also an order of magnitude shorter than the resulting code.

To illustrate automated code generation, FIGS. 31–35 illustrate automatically generated C++ code that implements the model.

Figure 31A:
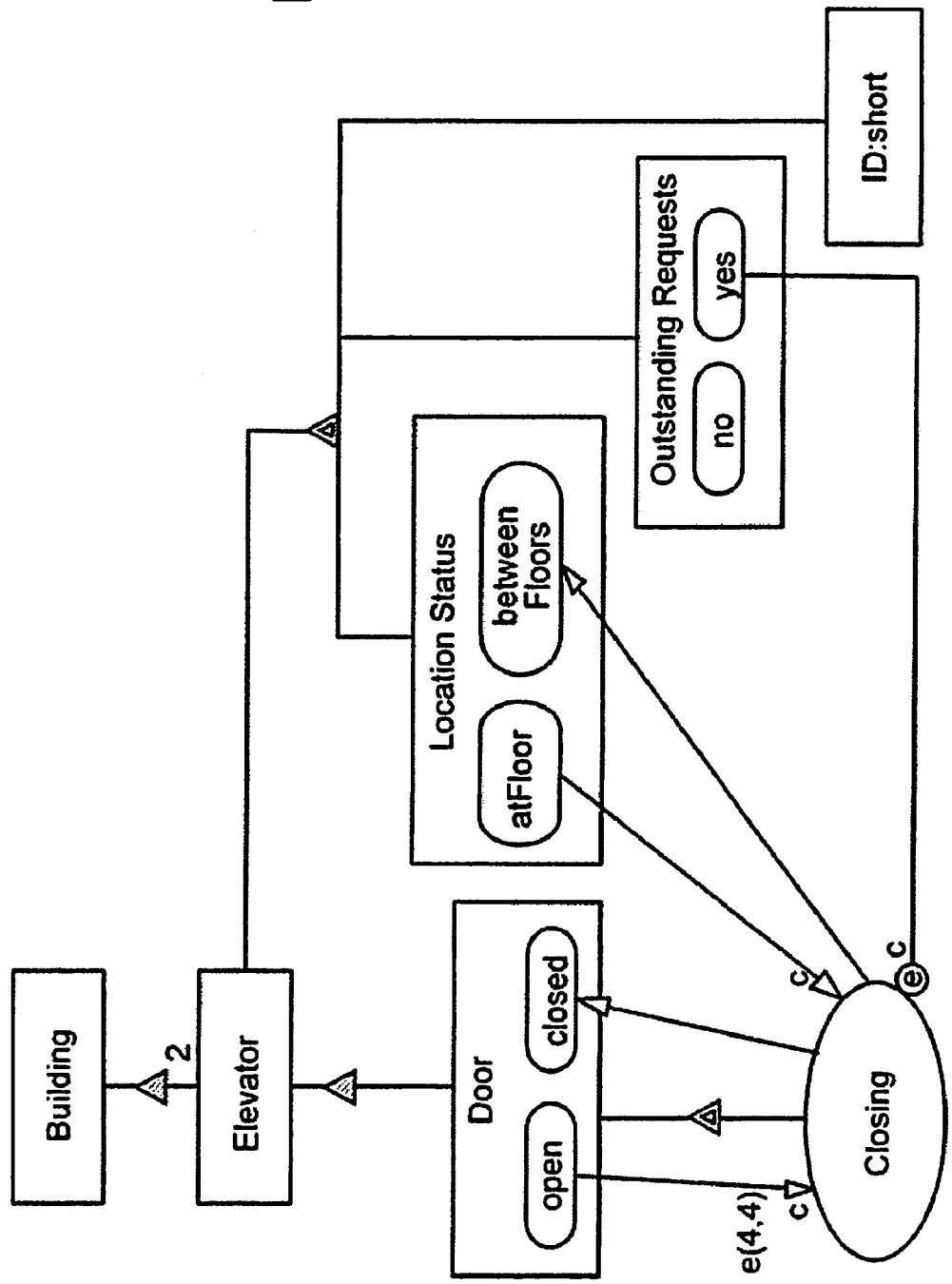
FIG. 31 is a diagram representing an elevator system.

In greater detail, FIG. 31 depicts a system where a "Closing" process changes the state of a "Door" sub-part of a building elevator from an "open" state to a "closed" state. The corresponding OPL text concisely describes this system. The syntax of OPL enables easy parsing of the OPL script by an OPL compiler. For example, the name of event "Door_open" is a combination of the name of the state whose entrance constitutes a triggering event (open), preceded by the name of the object containing this state (Door). The event name is followed by the event type, which, in this case is [state entrance], and by the path that leads from the state "open" of the object "Door" to its root. The root is the closest object up the structure hierarchy that includes all the features of a thing. In the example shown, the root of the object "Door" is "Building", since "Door" is a part of an "Elevator" and there are two "Elevators" in the "Building". For this reason, the Elevator's identifiers are also specified as [ID in {1 to 2}]. The next part of the sentence is the triggering clause: " . . . triggers Closing of Door of Elevator [ID] of Building with a reaction time of 4." This clause specifies that it is the process "Closing" which is triggered by the event "Door_open", specified in the first part of the sentence. The reaction time constraint (a minimum of 4 seconds and a maximum of 4 seconds, abbreviated simply as 4) specifies that exactly 4 seconds must pass between the state entrance event Door_open and the triggered process "Closing".

Again, the OPL compiler accepts an OPL script that specifies a system and automatically converts the OPL script file into C++ code. The OPL compiler includes modules symbolTable, lexer, parser, emitter, error, and init, which initializes the symbolTable. To allow for efficient compilation, a pre-processing pass on the OPL script arranges the OPL sentences in depth-first search (DFS) order. In addition to the usual DFS requirements of a tree structure, this DFS order pre-supposes a particular order of the types of OPL sentences. For example, the features of a thing (object or process) should be specified before its parts. For example, in the OPL script of FIG. 27, the features of "Elevator", which are "ID", "OutstandingRequests", and "LocationStatus" are fully specified before the part(s) of "Elevator" (e.g., "Door") are specified.

The OPL compiler parses the arranged input file in two passes. During the first pass, it generates an intermediate file (simplestate.def), which contains names of stateless objects (objects that do not have states), along with the path leading to their root. During the second pass the compiler uses this file to distinguish between two types of triggering events: state-change events and value-change events. It also writes the compiled specification-dependent C++ code into the appropriate C++ output files in an append-only manner.

When the compiler encounters a thing (object or process) it recursively parses the OPL sentences that specify that thing. The first OPL sentences processed are structure sentences, which include specialization sentences, generalization sentences, state enumeration sentences, exhibition sentences, and finally, aggregation sentences. In the case of a process, the behavior sentences, which include triggering event sentences, guarding conditions sentences, enabling sentences, result sentences, consumption sentences, and effect sentences, are processed in this order.

The OPL-to-C++ compiler may proceed according to compilation rules. These rules can handle such issues as the scope of each thing (object or process) and its members, the parameters of each method, and so forth. An extended discussion of one example set of compilation rules follows.

All objects inherit, either directly or indirectly, from the abstract-Object class. Major processes can be defined as stand-alone processes, which inherit from the generic Process class, while other processes are defined as methods of other classes. A process can be defined as a method of an object B if and only if it affects values or states of objects that are internal to B (i.e., attributes or parts of B) and has no side effect on objects that are external to B.

Each stand-alone process has two methods—Trigger and Execute, and the attribute Name. The Trigger method checks the process preconditions, and if they hold, calls the Execute method.

The fundamental structural relationships of aggregation and characterization are both converted in the same way: If an object B has a part or a feature (where a feature is an attribute or a method), that part or feature is declared as a private member of B. This rule also applies to both simple and complex parts and features.

Each complex object is translated into a C++ class. A complex object is derived, either directly or indirectly (if it is a specialization of another object class) from the generic built-in Object class. As shown in the C++ listing of FIG. 32 for the diagram depicted in FIG. 31, the objects "Building" (line 1), "Elevator" (line 3), and "Door" (line 11), as well as "LocationStatus" and "OutstandingRequests" (not shown) are translated into C++ classes.

Simple (i.e., non-complex) OPL objects, such as the object "ID" of type short, are defined as private members of the classes to which they belong (either as features or as parts). The public methods get and set, are defined for each simple object, as shown for "ID" in lines 6–9 of FIG. 32.

Each compound process is compiled into a C++ class that is derived, either directly or indirectly (it is a specialization of another process class) from the generic built-in Process class. As an example, the process "Closing", which is triggered by the event of the "Door" entering state "open", is translated into a C++ class, as shown in line 22 of FIG. 32.

A compound process B has the methods Trigger and Execute, which correspond to the sub-processes "Triggering" and "Executing" of FIG. 36 (described below). Trigger checks the process guarding conditions. If they hold, the public method Trigger of B calls the private method Execute of B, which implements the specific process behavior. The Trigger and Execute methods of process "Closing" are shown in lines 25 and 28 of FIG. 32, respectively.

A simple (i.e., non-complex) OPL process is compiled into two methods: process-nameTrigger and process-nameExecute. Like the Trigger and Execute methods of a compound process, the process-nameTrigger method checks the process guarding conditions. If they hold, the process-nameExecute, which implements the specific process behavior, method is called.

If a complex thing G constitutes a part or a feature of another thing, H, then it is declared as a private class within H. For example, since "Elevator" is part of "Building", the class "Elevator" is declared within the class "Building", as shown in line 3 of FIG. 32.

Instances are created for each C++ class, be it an object class or a process class. Lines 33, 38, 42 and 45 in FIG. 32 list the instance creation for the classes "Closing", "Door", "Elevator", and "Building". Each C++ class also has a constructor method. These constructors are listed in lines 27, 35, 39 and 43 of FIG. 32.

An OPL state-containing object (i.e., an object that has states) has a C++ pointer to each one of its possible states. Each state belongs to the generic State class (or its specialized TimedState class, if the state is timed). For example, line 14 shows the C++ pointer generated for the state "closed" of "Door". For each state, the methods set_statename (e.g., set_closed) and enter_statename (e.g., enter_closed) are defined. A set_statename method initializes the state of an object, (e.g., set_closed initializes state "closed" of "Door") while enter_statename is used when an object changes its state (e.g., when "Door" leaves state "open" and enters state "closed").

For each state-containing object, a get_state ContainingObject method is defined, which returns its current state. For example, get_Door returns the current state of "Door", which can be either "open" or "closed". Lines 14–19 show the C++ code generated for the state "closed", of "Door".

The OPL guarding conditions sentence is checked by the Trigger method. If the guarding conditions hold, Trigger calls the Execute method. Execute uses the enablers of the process, which are specified in the enabling object sentence. Execute transforms objects that are specified in the OPL effect, consumption and yield sentences. For example, the guarding condition sentence "Process Closing is guarded by "Door is open", "OutstandingRequests of Elevator is yes" and "LocationStatus of Elevator is atFloor" is translated into the Trigger method of "Closing", as shown in FIG. 33. Trigger checks the different guarding conditions and combines them according to the AND/OR logical links, which are specified in the OPD and reflected in the OPL sentences, where ',' serves as AND. If the set of guarding conditions hold, Trigger calls the Execute method of the process "Closing".

An OPL triggering event sentence is translated into part of the C++ method "EventProcessTable::TriggerAllProcesses (Event *e)" that builds an Event-ProcessTable that specifies the triggered process) for each event.

FIG. 34 depicts the code generated for the OPL behavioral sentence "Event Door_open [state-entrance] of Door of Elevator [ID in {1 to 2}] of Building triggers Closing of Door of Elevator [ID] of Building with a reaction time of (4,4)." As shown, the automatically generated C++ code first checks the identity of the triggering event. If it is equal to "door_open", then the identity of the triggering object is checked. This identity can be either Elevator1 or Elevator2. In each case, process "Closing of Door" of the appropriate Elevator is triggered within the specified reaction time (e.g., 4 seconds).

FIG. 35 illustrates how the OPL effect sentence "Closing affects Door of Elevator from open to closed and Location-Status of Elevator from atFloor to betweenFloors" is translated into the Execute method of "Closing", which specifies the way "Closing" affects other objects by changing their states.

The code generated by the OPL compiler relies on predefined C++ modules. These modules serve as instruments for a variety of processes.

The predefined modules include the Event and Event-Queue Modules for Handling Events and Timeout Events. Each time an event occurs, a record of it is created and inserted into the EventHistory and into the EventQueue. The event can be internal (e.g., an object entering a new state) or external (e.g., a user hitting a keyboard character).

An event features the event name and type, the identifier of the object that triggered the event, $T_{occ}$—the time at which the event occurred, and $T_{ins}$—the time at which the event was inserted into the event queue. $T_{occ}$ can be used to check whether reaction time constraints (i.e., constraints on the time elapsed between the event occurrence and the process triggering) are met. $T_{ins}$ can be used in order to allow the insertion of future events (such as future timeout events) into the EventQueue.

The EventQueue contains Event objects ordered by $T_{ins}$. When an Event first occurs, both its $T_{occ}$ and $T_{ins}$ are given the value of the current time and the Event is inserted into the EventQueue.

If the Event e1 that is about to be inserted into the EventQueue has a $T_{ins1}$ that is equal to a $T_{ins2}$ of another event, e2, which already exists in the EventQueue, then Event e1 is inserted after Event e2.

When an Event marking an entrance into a time-constrained state occurs, two Events are inserted into the Event Queue: a state-entrance Event and a future state-timeout Event. The Event of type state-entrance is assigned values such that $T_{occ}=T_{ins}=T_{now}$. That is, both the time of event occurrence, $T_{occ}$, and the time the event was inserted into the EventQueue, $T_{ins}$, are equal to the present time, $T_{now}$.

The Event of type state-timeout is assigned future time values such that $T_{occ}=T_{ins}=T_{now}+T_{max}$. That is, both the time of timeout event occurrence, $T_{occ}$, and the time the timeout event, $T_{ins}$, are equal to the present time plus the maximum time, $T_{max}$, that should be spent in the time-constrained state.

If the time-constrained state is exited before the maximum time that should be spent in the time-constrained state, $T_{max}$, is exceeded, then the future state-timeout Event is deleted from the EventQueue. Otherwise, when the timeout materializes, i.e., the future point in time equals $T_{max}$, then the state-timeout Event marking this timeout is popped from the EventQueue.

The predefined modules also include a process module. The generic compound Process class has a Name attribute, and it contains a constructor and the two methods Trigger and Execute. Each time the Execute method is executed, a record of an occurrence of Process is inserted into its HistoryRecordSet.

The C++ code generated for the classes TimedProcess and DelayedProcess is based on the generic TimedProcessing process. Process-nameWait and Process-nameOutput are the C++ names of the "Waiting" and "Outputting" processes, respectively. If $T_{execution}$ is supplied, then the minimal and maximal waiting times of Process-nameWait are $T^w_{min} = T^w_{max} = T_{min} - T_{execution}$, as are the waiting times of "Waiting". Otherwise, $T^w_{min} = T^w_{max} = T_{min} - \delta$, where $\delta$ is a small number, in the order of milliseconds, to allow some time for the Process-nameOutput to execute.

Process-nameWait generates a process termination event, whose $T_{ins} = T_{occ} = T_{now} + T^w_{min} - \delta$. This process termination event is inserted into the EventQueue, and when popped, triggers Process-nameOutput. In order to simulate a time exception of Process-nameWait, in some small number of randomly selected cases, the process termination event of Process-nameWait is given the values $T_{ins} = T_{occ} = T_{now} + T^w_{min} + T_{penalty}$, where $T_{penalty}$ is the amount of time that the process is simulated to be late. In addition, a process timeout event of Process-nameWait is also inserted into the EventQueue at the time that the process was supposed to end, at the latest, namely $T_{ins} = T_{occ} = T_{now} + T^w_{max}$.

Since the Process-nameWait method takes close to zero time, the only time that the TimedProcesses actually consumes is the time needed for it to compute its output results via the Process-nameOutput method. The scheduler enables a certain extent of concurrency by using the time elapsed between the completion of the execution of the Process-nameWait method and the beginning of the execution of the Process-nameOutput method.

Before outputting its result, a TimedProcess for which $T_{max} < \infty$, i.e., one that has a non-infinite maximum timing constraint, checks whether this maximum timing constraint is met, allowing a deviation of $\delta$ from $T_{max}$. If not, i.e., if the processing time exceeded $T_{max}$, then it does not output its result. If the timing constraint is hard, i.e., if an exception link emanates from that process, a time exception event, i.e., an event signaling the exception of the maximum duration constraint, is registered. A better hard time constraint scheme is for a TimedProcess to check the maximum bound during its execution, and if it is violated, register the exception event and terminate the process. This scheme is not implemented in the current version of our compiler.

The predefined modules include a state module. The State class models a state. Each State has the following methods:

(a) The set_state-name method, which sets the attributes (parameters) of the state. The attributes include Temporal order, i.e., whether the state is an initial state (source), a terminal state (sink) or a regular state; and a Triggering object, i.e., which object (if it is knows ahead of time) triggers the event of entering the state; and (b) The enter_state-name method which checks if it is possible to leave the state in which the object is currently in and enter the new state. In case the entrance into the state constitutes a triggering event, then the enter_state-name method inserts this triggering event into the EventQueue. This event is deleted from the EventQueue when the state is exited.

A TimedState is a time-constraint State. It has the attributes $T_{min}$ and $T_{max}$ for the minimum and maximum timing constraints, respectively, and $T_{last}$ for keeping the time in which the state was last entered. If the TimedState has a minimum duration constraint, then the TimedState cannot be exited before this time has elapsed. This time constraint, $T_{now} \geq T_{last} + T_{min} - \delta^3$, is checked by the TimedState TryToLeave method, which is called by the enter_state-name method.

The predefined modules also include a Scheduler module. The Scheduler loops between accepting any arriving external Event (represented by keyboard strokes or any other external stimuli), and popping an Event from the EventQueue. An Event is always popped from the beginning of the EventQueue, so Events that were inserted earliest into the EventQueue are popped first. An Event can be popped out of the EventQueue only if the time of its occurrence, $T_{occ}$, is earlier than the present time, $T_{now}$. Once an event is popped from the EventQueue, it is passed to the Event-Process Table, which tries to trigger the appropriate Process. If the reaction-time constraints and the guarding conditions of the Process are met, then the Process is triggered. Once a Process is triggered it is not preempted, i.e., it continues its execution without interruption until finally, it terminates.

The Event-Process Table specifies the Process that should be triggered by each Event, and the reaction-time constraints on the time elapsed between the time of the occurrence of the event, $T_{occ}$, and the time the appropriate Process is triggered.

If $T_{now} - T_{occ} < T_{min}$, that is, the time elapsed from the time the Event occurred until it is presently popped from the EventQueue, ready to trigger a process, $T_{now} - T_{occ}$, is less than the minimum reaction time constraint, $T_{min}$, then the Event is inserted back into the EventQueue. Its $T_{occ}$ does not change, but its $T_{ins}$ is given the present time, $T_{now}$.

If $T_{now} - T_{occ} > T_{max}$ then it is too late to trigger the process linked to the triggering event. In this case, the Event is ignored and is not inserted back into the EventQueue.

If the present time, $T_{now}$, is within the bounds of the reaction-time constraints, then the Trigger method of the process that should be triggered by this triggering Event can be executed. Trigger checks the guarding conditions of the process, and if they hold, it calls the Execute method of the process.

If the guarding conditions do not hold but the present time, $T_{now}$, is still within the bounds of the reaction time constraints (i.e., it will still be possible to check the guarding conditions at a later time) then the Event is inserted back into the Event Queue. The Event now has a $T_{ins}$ value that is equal to the present time, $T_{now}$.

A History module deals with recording the history of Events that were generated and Processes that were executed, in the course of the application execution. The Mtime class is the time-class used by applications. Its time granularity is of the order of milliseconds. It contains operators for comparing two Mtime objects (e.g., =, ≠, >, <, ≥ and ≤) and methods for increasing an Mtime object by a given amount of time.

Figure 36:
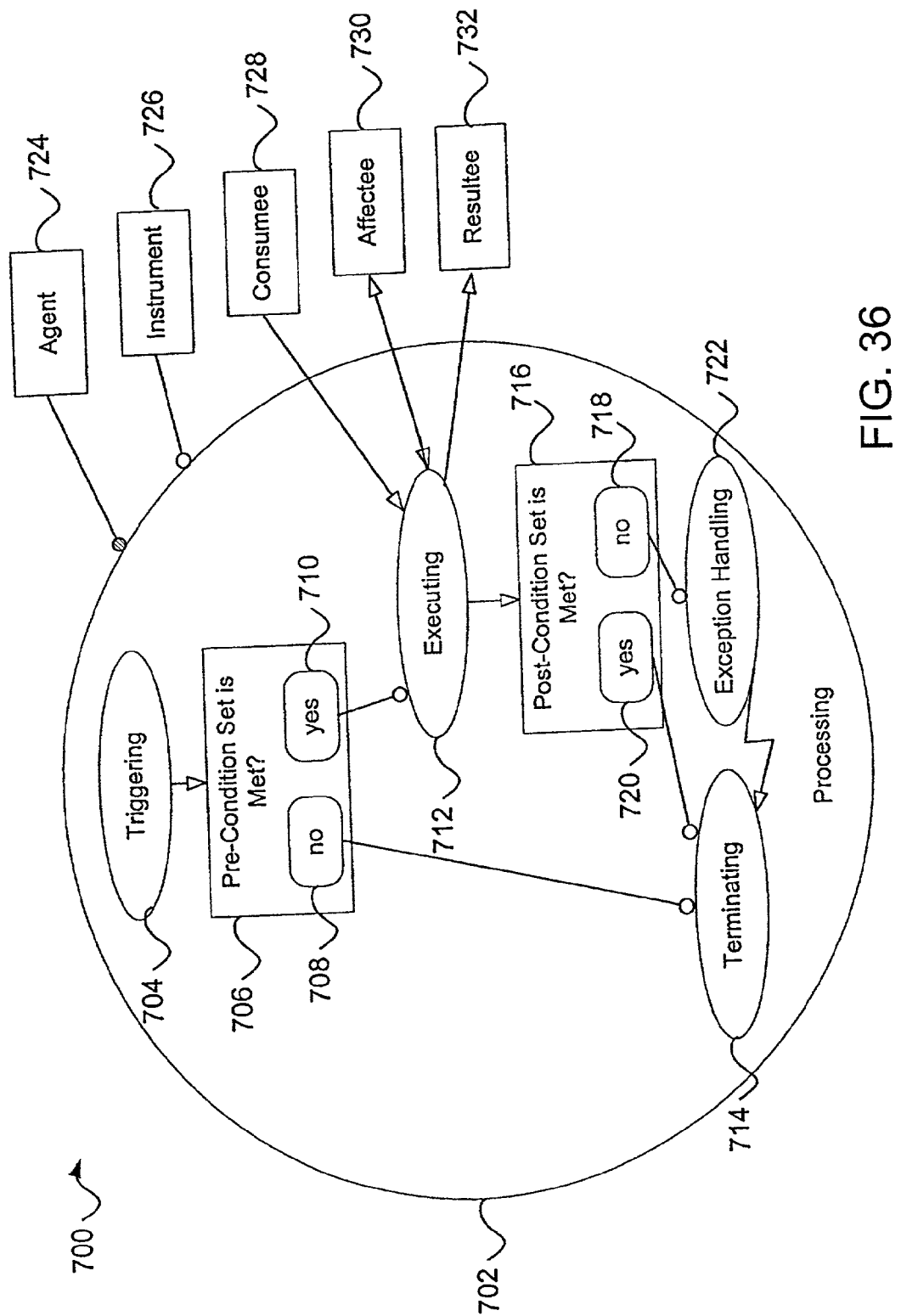
FIG. 36 is a diagram illustrating a generic processing process.

FIG. 36 is a meta-OPD that shows a generic compound process, called Processing. The Processing process generically represents how the tool organizes information of a diagram, for example, to automatically generate code, provide a simulation, and otherwise make sense of a OPM/OPL model. The right-hand side of this OPD shows an Involved Object Set with its two Enabler types and three Transformee types—Affectee, Resultee and Consumee, along with their corresponding procedural links—effect link, result link and consumption link. Processing includes two constituent sub-processes: Triggering and Executing. Each time Executing operates a record of an occurrence of Processing may be inserted into a HistoryRecordSet of Processing.

Enablers, who are Agents and/or Instruments, optionally enable the entire Processing process. Their possible involvement in the two sub-processes of Processing can be inferred from the fact that they touch the outer circumference of the process, rather than just one of its sub-processes.

Each process has a (possibly empty) Pre-condition Set—a set of logical conditions that are checked by the process Triggering. A condition can be a Boolean expression, a test as to whether particular objects are in specific states required for Execution to take place, and so forth.

The Pre-condition Set can be in a True or False state. The sub-process Triggering checks each condition in the Pre-condition Set. If the Pre-condition Set is evaluated to True, then Executing is allowed to start. The sub-process Executing constitutes the particular behavior of Processing (the "body" of the procedure/function/routine/operation/method). Executing transforms the Transformees of the Processing process. It can change the state of the Affectees via the effect link, it can create the generated Resultees via the result link, and it can consume the Consumees via the consumption link. Executing may require the involvement of one more Enablers of Processing—Instruments as well as Agents.

In addition to automatic code generation, the system can provide other helpful design features. For example, the tool can use the generic processing model of FIG. 36 to provide animated simulations of a modeled system to demonstrate modeled execution threads. The simulation can also verify design intents and program logic. The simulator can be suited to real-time systems and accept time constraints of lower and upper bounds of being in a state, duration of a process, or the transition time between states. Exceeding these upper or lower bounds triggers and exception handling process. This information is used to run the simulation.

The simulation can be continuous or step-controlled by the user. The simulation starts by the user selecting a subset of things (objects and/or processes) and specifying states of objects that trigger some process. The simulation can depict the state(s) of an object by changing the color of the current state(s) and use various colors for things (objects and processes) that are in the past, present or future. The simulation can indicate continued execution of a process by flashing and/or changing colors of the process ellipse. As soon as the process terminates, all the post-process effects take place (e.g., new objects can be generated, input objects consumed, change of states, and so forth). The time duration of a process can be fixed or randomly drawn from a pre-specified distribution function with given parameters. In addition, multimedia artifacts can be switched on or off along with generation or destruction of objects or change of their state.

As an example, consider a simulation of the Wedding process of FIGS. 9 and 12. In these diagrams the user specifies the initial conditions of Person as being at state "single". This state is inherited to both the Sam and Jane instances of Person. The user also specifies that Justice and License are present. These are the pre-conditions for the License Verifying process. The simulation shows this process as the first to take place by coloring the ellipse of this process red. The time duration of this process is specified as 10 minutes. The simulation represents each 10 minutes as 1 second, so the coloring lasts 1 second, after which only the circumference of the process remains red, indicating this process has passed. The process generates the Boolean object "License is Legal?". This object changes its color from gray to green. A pre-defined distribution function with 0.98 probability of success is run and determines that "License is Legal". This is denoted by coloring the "yes" state of the Boolean object. The pre-conditions for the "Ceremony Conducting" process are (1) presence of one instance of "Man" and one instance of "Woman"; (2) presence of "Justice"; and (3) "Legal License". Since all three preconditions are met, "Ceremony Conducting" is triggered and colored red. A normal distribution function with a mean of 35 minutes and standard deviation of 15 minutes has been predefined. The actual length of the ceremony is computed by the simulation program to be 40 minutes, so the coloring lasts 4 seconds. Immediately thereafter, two things happen: (1) "Dining" is triggered unconditionally; and (2) the object "Couple" is now generated, which is marked by changing its color from gray to green and flashing a couple of times. "Dining" is determined to take 120 minutes, so it is colored red and flashes for 12 seconds. Guest Group is hungry as long as the Dining takes place. This is denoted by the hungry state being colored. As soon as "Dining" terminates, the state "hungry" is uncolored and state "full" becomes colored. This is when the simulation ends. On the average, 1 in 50 simulations would end with "Wedding" being postponed due to an illegal "License".

Automatic code generation and the system simulation features described above illustrate potential benefits from the formal expression of a system in OPM/OPL. Again, at the heart of the system are techniques for generating formal text sentences for graphic constructs, and vice-versa. Another benefit of this bi-modal graphic-textual representation of the system is the ability of people with various backgrounds and preferences to relate to the system specification by inspecting either the graphics or the text and in case some point is unclear at one, the other can be consulted. No programming background is required as the language is a subset of English and the symbol set is small and intuitive.

Figure 37:
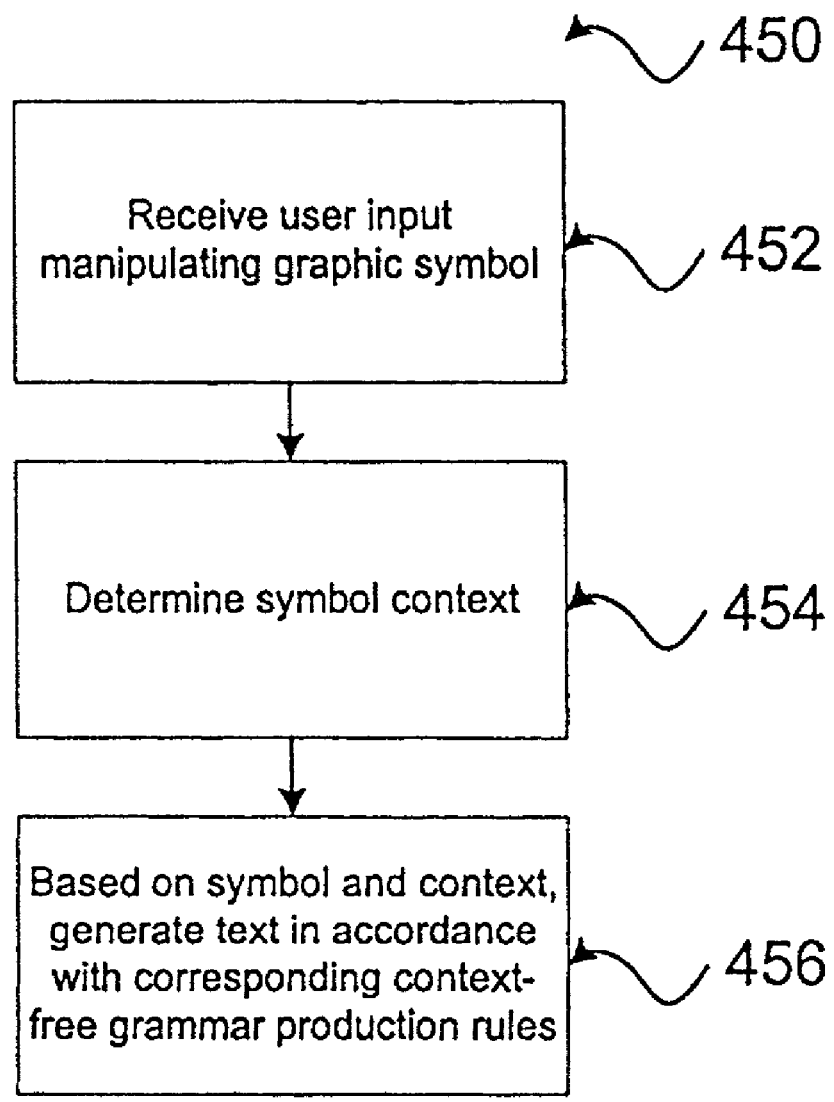
FIG. 37 is a flowchart of a process for generating text based on graphic elements in a diagram.

FIG. 37 illustrates a process 450 for generating text based on received user input 452, such as user input creating or connecting a graphic element to another graphic element. A pattern recognition process operates on the user input and maintains equivalence between the graphics and the text. The process identifies pre-defined constructions or symbol arrangements which translate to specific formal English sentences types as specified in a pattern lookup table.

As described above, some symbols are graphically overloaded, i.e., they perform "double" duty. For example, a blackened triangle may indicate aggregation or a Boolean AND, depending on the triangle connections. Thus, the process 450 may determine 454 the context of the symbol, for example, by identifying other connected or linked symbols. Based on the symbol and determined 454 context (e.g., pattern recognized from the lookup table), the process 450 identifies 456 a corresponding sentence type and outputs or updates 450 a formal English sentence using the identified sentence type and the relevant symbol labels.

Figure 38:
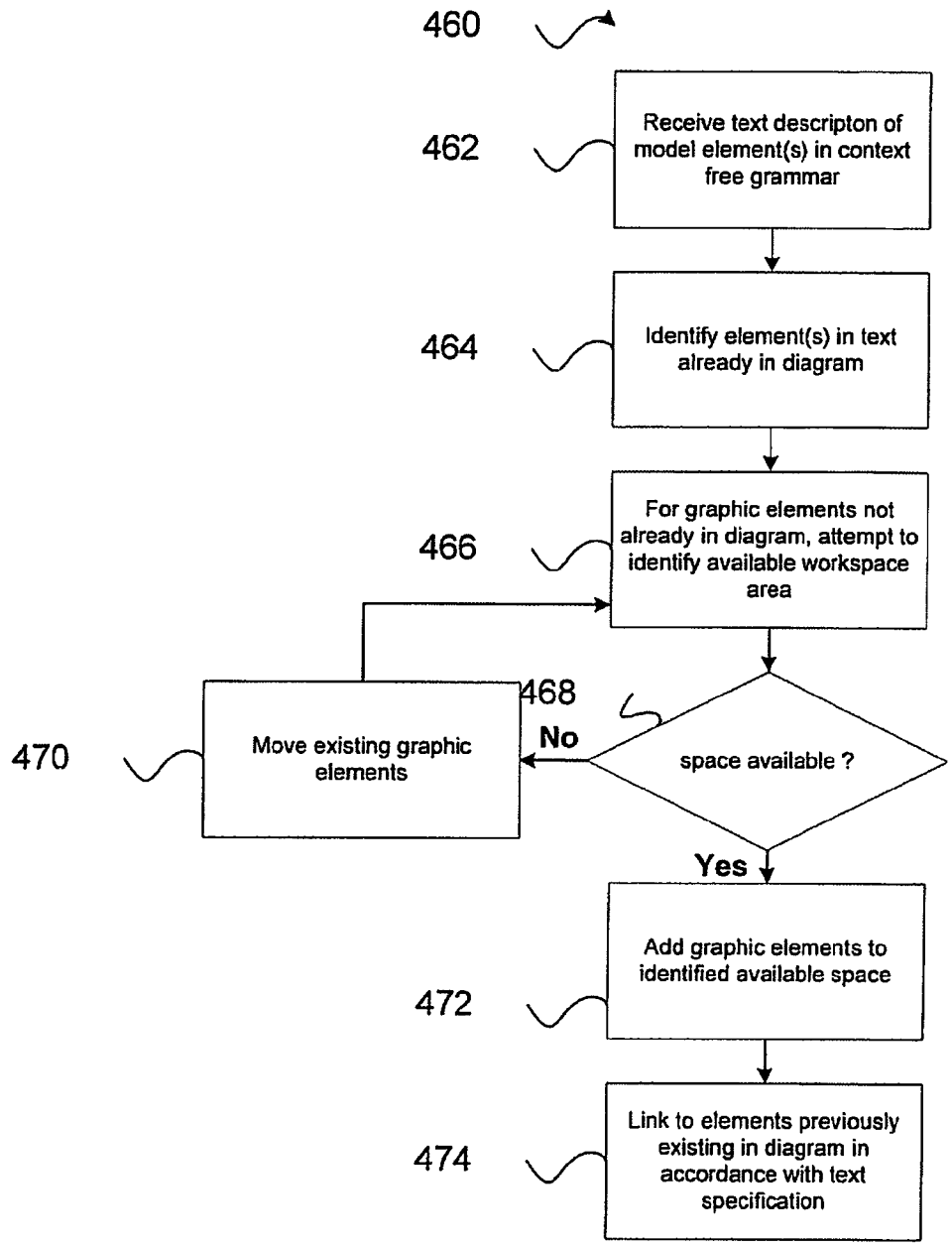
FIG. 38 is a flowchart of a process for modifying a collection of graphic elements in a diagram based on text.

FIG. 38 illustrates a process 460 for modifying a graphic depiction of a system based on received text. The process 460 parses the text, in accordance with the context-free grammar production rules, to identify, for example, the type of sentence, labeled elements included in the text and so forth. The process 460 can verify that that the sentence constitutes a syntactically legal sentence. If not, the system can present a set of syntactically correct alternatives for user selection. The process 460 can also notify a user if a sentence semantically contradicts a previously existing sentence.

After parsing, the process 460 can identify 464 text elements already depicted in a diagram. For elements not yet depicted, the process 360 attempts to identify available workspace area for the addition of new elements. Such attempts may be based on legibility metrics, such as the size of a closed shape (object, process, state) required to contain its label, a penalty for the amount of overlapping of closed shapes, containment requirements (such as states within object, sub-processes within a zoomed-in process, etc.), intra-symbol distances, the number of intersecting links caused by a particular placement, link lengths and number of bendings, and so forth. Each metric has a weight and a value. A score is calculated and an objective function is attempted to be optimized. If a satisfactory space exists 468 (e.g., if the calculated weighted score of the metric values exceed a threshold), the process 460 can add 472 the symbol to the diagram in the identified space and inter-connect 474 the symbol to other elements as specified by the text. If no satisfactory space exists 468, the process 460 can attempt to move existent graphic elements to create room. For example, the process 460 can identify spaces having the relative best metric scores and attempt to move bordering graphic elements away from these spaces. Each moving of elements is judged again the same set of criteria and a weighted score of the metric values is calculated.

A method in accordance with some embodiments of the invention may further include, for example: automatically generating documentation of the model diagram, the documentation having graphics and text included in at least one file; allowing a plurality of users to work in real time on the model diagram; importing at least a portion of the model diagram from another model diagram; based on the model diagram, enforcing a set of business rules pertaining to a domain; based on the model diagram, automatically generating at least one diagram in accordance with a modeling language; based on the model diagram, automatically generating at least one diagram in accordance with Unified Modeling Language (UML).

As described above, OPM/OPL can model a wide variety of systems and potentially generate/simulate such systems. Additionally, the system can provide capabilities beyond the realm of modeling. For example, the system can aid in translating text from one natural language to another. For instance, FIGS. 39 and 40 illustrate translation of a passage from English to French.

Figure 39:
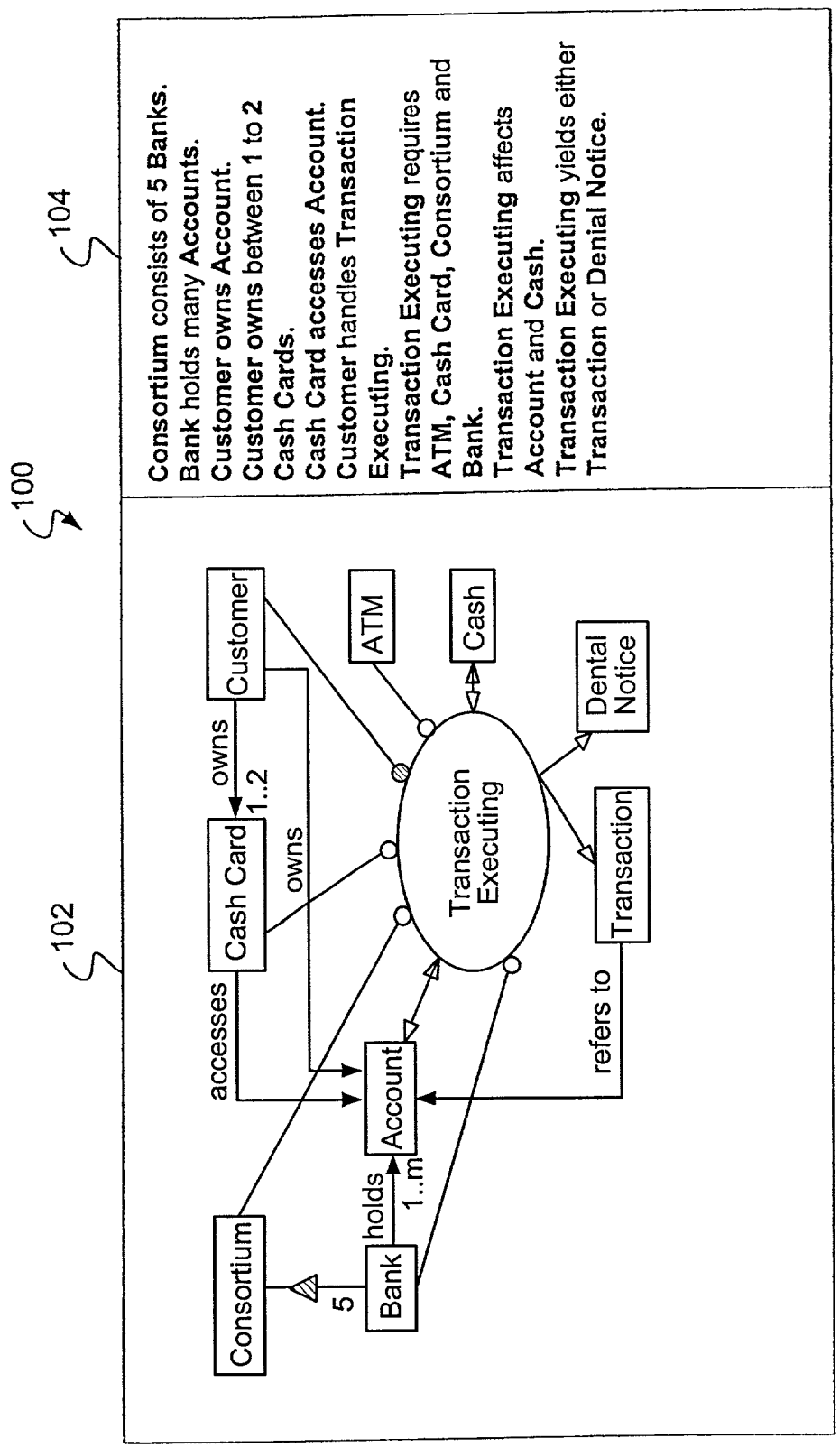
FIGS. 39 and 40 are screenshots of a modeling tool illustrating language translation.
Figure 40:
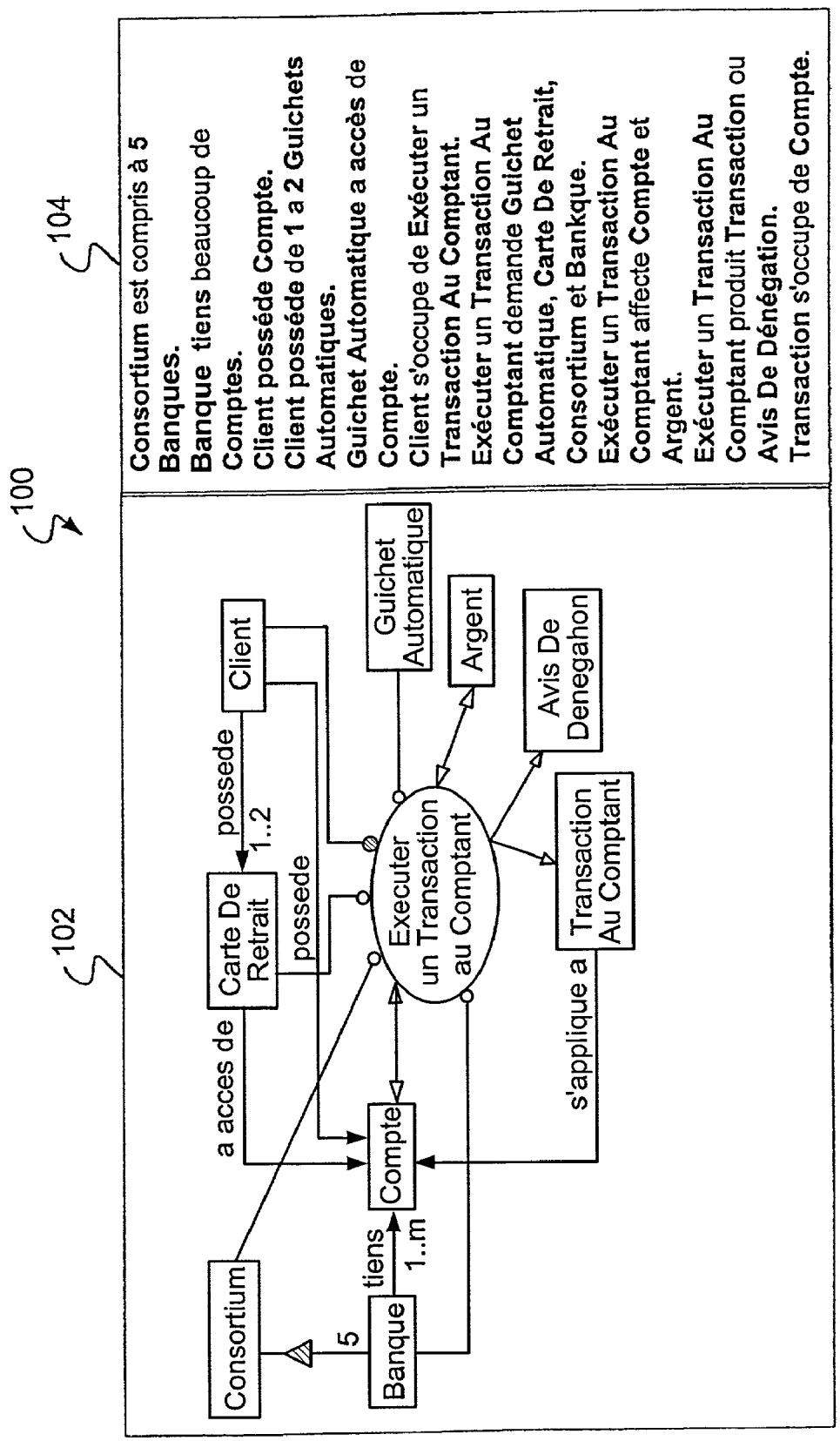

FIG. 39 illustrates an OPM diagram and corresponding formal English description of an ATM (Automatic Teller Machine) system. The system model 102 and formal English 104 reflect the following free style prose.

> A consortium consisting of five banks operates an ATM system. Each bank holds many accounts, one for each customer. An account is accessible through a cash card. A customer can own one or more cash cards. The main process the ATM system is designed to carry out is the execution of cash dispensing an depositing transactions. Each transaction refers to an account. Executing the transaction can end up with exactly one of the following two outcomes: (1) it can yield a (successful) transaction; or (2) it can issue a denial notice.

As shown in FIG. 39, the element labels and text sentences 104 appear in English.

FIG. 40 displays a copy of the same diagram where the element labels have been translated to French. Such translation may be performed using a look-up table storing translations of different words and phrases. To increase translation accuracy, the look-up table may include domain-specific translations. For example, a system model identified as being in the finance domain will translate "bank" as "Bankque" instead of the French word for "River Bank".

FIG. 40 also shows the corresponding text sentences 104 in formal French. In addition to reflecting the translation of element labels, the sentences 104 also feature French reserved words and syntax (e.g., the English "affect" becomes the French "affecte"). The same sentence type (e.g., a state enumeration sentence) may differ in different natural languages. For example, one natural language may have a syntax that orders terms differently than another.

Thus, as shown in FIGS. 39 and 40, to obtain a suitable translation of a passage, a user need only create a diagram of the passage and request translation. The system can then translate the element labels and formulate sentences in the destination language in accordance with the sentence types corresponding to the diagram.

While FIGS. 39 and 40 show translation for a single diagram, a model may include a set of diagrams. For example, the "Transaction Executing" process may encapsulate other entities. It should be understood that the system can translate all diagrams in a system model.

Figure 41:
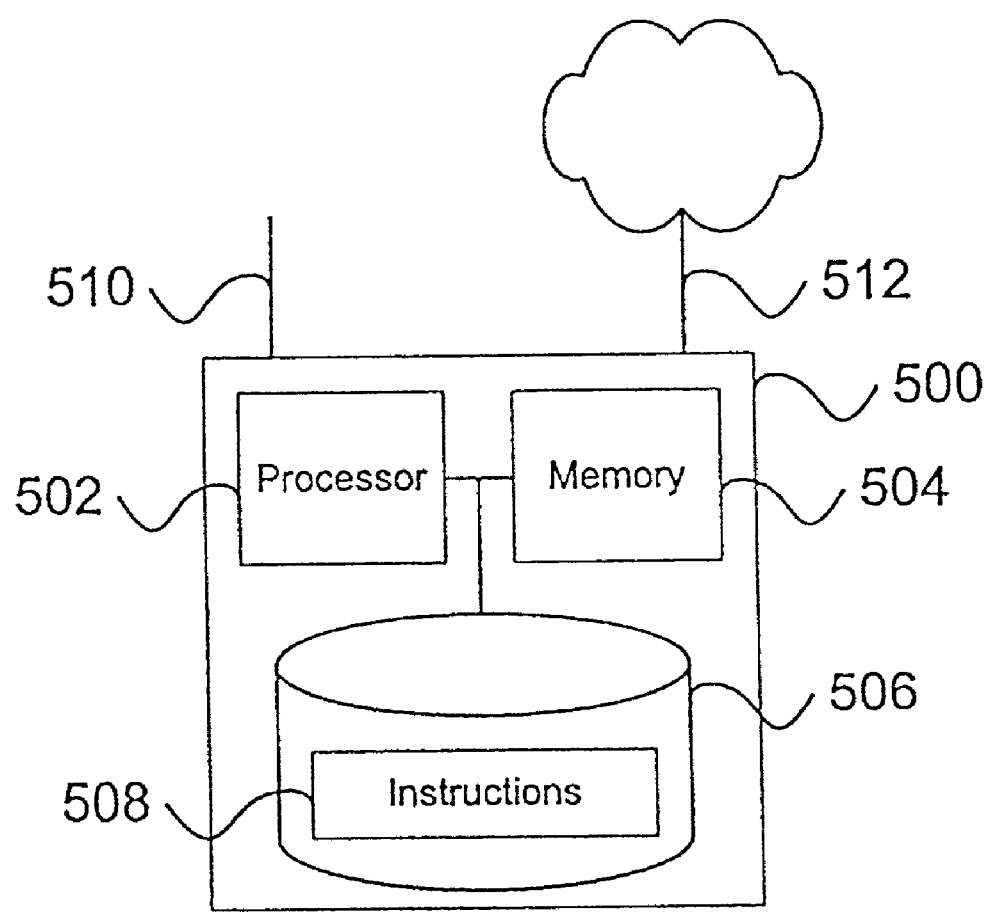
FIG. 41 is a diagram of a computer platform.

FIG. 41 illustrates a computer platform 500 suitable for executing real-time or batch tool instructions 508. As shown, the platform 500 includes one or more processors 502, volatile memory 504, and non-volatile memory 506. The non-volatile memory 506, such as a hard disk, stores the instructions, for example, after installation from a disk, CD-ROM, or transmission over a network. In the course of operation, the instructions 508 are transferred from the non-volatile memory 506 to the volatile memory 504 and the processor(s) 502. As shown, the platform 500 includes a connection 510 to external devices such as input devices (e.g., keyboard, mouse, and so forth) and output devices (e.g., a speaker, monitor, an so forth).

The platform 500 also includes a network connection 512 to send and receive information such as models and model fragments to other networked devices. For example, the system can work in a collaborative mode using a coordinated distributed database of the formal English and/or corresponding diagram. Users distributed geographically and can check-out parts of the model that they can modify and then check-in, while other team members can work on other parts of the system.

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers, each including a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of modeling, the method comprising:

receiving input specifying at least one graphic element of a model diagram, different graphic elements in the diagram including a first graphic element representing a process and a second graphic element representing an object, wherein said model diagram represents one or more functional aspects, one or more structural aspects, and one or more behavioral aspects of a system, and wherein said model diagram includes symbols representing stateful objects associated with states and processes, structural links, procedural links, and control links;

identifying a graphical pattern corresponding to a combination of one or more processes and one or more objects in said model diagram;

based on the received input and said graphical pattern, generating a textual description of the diagrammed model, wherein said textual description is consistent with at least a subset of a natural language; and in response to modification of said diagrammed model, modifying said textual description to reflect the modification of the diagrammed model.

2. The method of claim 1, wherein the graphic elements correspond to a notation, modeling objects and processes as independent elements.

3. The method of claim 2, wherein the notation comprises a notation in accordance with a system that models objects and processes as independent entities.

4. The method of claim 1, wherein generating the textual description comprises:

determining one or more context-free grammar production rules corresponding to the input; and generating a context-free grammar expression from the one or more context-free grammar production rules.

5. The method of claim 4, wherein the production rules comprise production rules consistent with at least a subset of a natural language.

6. The method of claim 1, wherein at least a portion of the model diagram and at least a portion of the textual description are displayed simultaneously.

7. The method of claim 1, wherein the received input comprises receiving user input.

8. The method of claim 7, wherein generating the textual description comprises generating the description in real-time response to the received user input.

9. The method of claim 1, wherein generating the textual description comprises generating in a batch mode.

10. The method of claim 1, further comprising receiving input specifying a level of detail to depict.

11. The method of claim 10, further comprising determining a portion of the textual description to display based on the received user input specifying the level of detail.

12. The method of claim 1, further comprising translating a label of a graphic element from a subset of said first natural language to a subset of a second natural language.

13. The method of claim 12, wherein generating the textual description comprises generating the textual description using production rules of a context-free grammar for the subset of the second natural language.

14. The method of claim 1, further comprising using the generated text as input for a generic code generator, able to further receive as input a set of rules for translating the generated text into a specific programming language.

15. The method of claim 1, further comprising using the generated textual description to provide a simulation of a modeled system.

16. The method of claim 1, comprising:

automatically generating documentation of the model diagram, said documentation having graphics and text included in at least one file.

17. The method of claim 1, comprising:

allowing a plurality of users to work in real time on said model diagram.

18. The method of claim 1, comprising:

importing at least a portion of said model diagram from another model diagram.

19. The method of claim 1, comprising:

based on said model diagram, enforcing a set of business rules pertaining to a domain.

20. The method of claim 1, comprising:

based on said model diagram, automatically generating at least one diagram in accordance with a modeling language.

21. The method of claim 1, comprising:

based on said model diagram, automatically generating at least one diagram in accordance with Unified Modeling Language.

22. A computer-implemented method of modeling, the method comprising:

receiving a textual description of a model;

identifying at least a portion of said textual description as being convertible to a graphical pattern corresponding to a combination of one or more processes and one or more stateful objects of said model;

based on the received textual description and at least said convertible portion, generating a model diagram composed of different graphic elements, the different graphic elements including a first graphic element representing a process and a second graphic element representing an object, wherein said model diagram represents one or more functional aspects, one or more structural aspects, and one or more behavioral aspects of a system, and wherein said model diagram includes symbols representing objects associated with states and processes, structural links, procedural links, and control links; and in response to modification of said textual description, modifying said diagrammed model to reflect the modification of the textual description.

23. The method of claim 22, wherein the graphic elements correspond to a notation, modeling objects and processes as independent elements.

24. The method of claim 23, wherein the notation comprises a notation in accordance with a system that models objects and processes as independent entities.

25. The method of claim 22, wherein the received textual description comprises a textual description in a context-free grammar.

26. The method of claim 25, wherein the context-free grammar comprises a grammar having production rules consistent with at least a subset of a natural language.

27. The method of claim 26, wherein generating the model comprises parsing the received input in accordance with the production rules.

28. The method of claim 22, wherein at least a portion of the model diagram and at least a portion of the textual description are displayed simultaneously.

29. The method of claim 22, wherein the input comprises user input.

30. The method of claim 29, wherein generating the model diagram comprises generating the diagram in real-time response to the received user input.

31. The method of claim 22, wherein receiving the textual description comprises receiving in a batch mode.

32. The method of claim 22, further comprising receiving input specifying a level of detail to depict.

33. The method of claim 32, further comprising determining a portion of the model diagram to display based on the received input specifying the level of detail.

34. The method of claim 22, further comprising using the generated text as input for a generic code generator, able to further receive as input a set of rules for translating the generated text into a specific programming language.

35. The method of claim 22, further comprising using the received input to provide an animated simulation of a modeled system, wherein dynamics of said modeled system are shown by at least animated flow of control, process execution, object creation, object destruction, and object state modification.

36. A method of translating text from a first natural language to a second natural language, the method comprising:
receiving input specifying a diagram including elements labeled in accordance with a first natural language, the diagram including at least one independent object and at least one independent process, wherein said diagram represents one or more functional aspects, one or more structural aspects, and one or more behavioral aspects of a system, and wherein said diagram includes symbols representing stateful objects associated with states and processes, structural links, procedural links, and control links;
identifying a graphical pattern corresponding to a combination of one or more processes and one or more objects in said diagram;
translating the element labels from the first natural language to the second natural language;
generating text in the second natural language in accordance with a grammar associated with the diagram elements; and
in response to modification of said input diagram, modifying said text in the second natural language to reflect the modification of said input diagram.

37. The method of claim 36, wherein the diagram comprises a diagram in accordance with a system that models objects and processes as independent entities.

38. The method of claim 36, wherein generating text comprises generating text using a context-free grammar associated with the diagram elements, the context-free grammar being consistent with the syntax of a subset of the second language.

39. A computer program product, disposed on a computer readable medium, for modeling, the computer program including instructions for causing a processor to:
receive input specifying at least one graphic element of a model diagram, different graphic elements in the diagram including a first graphic element representing a process and a second graphic element representing an object, wherein said model diagram represents one or more functional aspects, one or more structural aspects, and one or more behavioral aspects of a system, and wherein said model diagram includes symbols representing stateful objects associated with states and processes, structural links, procedural links, and control links;
identify a graphical pattern corresponding to a combination of one or more processes and one or more objects of said model diagram;
based on the received input and said graphical pattern, generate a textual description of the diagrammed model, wherein said textual description is consistent with at least a subset of a natural language; and
in response to modification of said diagrammed model, modify said textual description to reflect the modification of the diagrammed model.

40. A computer program product, disposed on a computer readable medium, for modeling, the computer program including instructions for causing a processor to:
receive a textual description of a model;
identify at least a portion of said textual description as being convertible to a graphical pattern corresponding to a combination of one or more processes and one or more stateful objects of said model; and
based on the received textual description and at least said convertible portion, generate a model diagram composed of different graphic elements, the different graphic elements including a first graphic element representing a process and a second graphic element representing an object, wherein said model diagram represents one or more functional aspects, one or more structural aspects, and one or more behavioral aspects of a system, and wherein said model diagram includes symbols representing objects associated with states and processes, structural links, procedural links, and control links; and
in response to modification of said textual description, modify said diagrammed model to reflect the modification of the textual description.

* * * * *